United States Patent
Kimura et al.

(10) Patent No.: US 8,466,970 B2
(45) Date of Patent: Jun. 18, 2013

(54) IMAGING APPARATUS, METHOD, SYSTEM INTEGRATED CIRCUIT, AND PROGRAM FOR CORRECTING INCLINATION OF SUBJECTS IN AN IMAGE

(75) Inventors: Masayuki Kimura, Osaka (JP); Junichi Tagawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 717 days.

(21) Appl. No.: 12/664,939

(22) PCT Filed: Jun. 5, 2008

(86) PCT No.: PCT/JP2008/001439
§ 371 (c)(1),
(2), (4) Date: Dec. 16, 2009

(87) PCT Pub. No.: WO2009/001512
PCT Pub. Date: Dec. 31, 2008

(65) Prior Publication Data
US 2010/0177197 A1   Jul. 15, 2010

(30) Foreign Application Priority Data
Jun. 27, 2007 (JP) ................................ 2007-168844

(51) Int. Cl.
*H04N 5/228* (2006.01)
(52) U.S. Cl.
USPC ..................................... 348/208.4; 348/222.1
(58) Field of Classification Search
USPC ................. 348/222.1, 208.99, 208.1–208.16, 348/239; 382/289, 293, 297, 276
See application file for complete search history.

(56) References Cited

U.S. PATENT DOCUMENTS

| | | | | |
|---|---|---|---|---|
| 5,375,194 | A | * | 12/1994 | Hori et al. ...................... 345/611 |
| 6,064,749 | A | | 5/2000 | Hirota et al. |
| 7,215,828 | B2 | * | 5/2007 | Luo ............................... 382/289 |
| 2005/0212931 | A1 | * | 9/2005 | Gallagher et al. ............ 348/239 |
| 2006/0197843 | A1 | | 9/2006 | Yoshimatsu |
| 2009/0022369 | A1 | | 1/2009 | Satoh et al. |

FOREIGN PATENT DOCUMENTS

| | | |
|---|---|---|
| JP | 2002-207232 | 7/2002 |
| JP | 2003-153072 | 5/2003 |
| JP | 2003-304486 | 10/2003 |
| JP | 2004-104463 | 4/2004 |
| JP | 2005-184685 | 7/2005 |

(Continued)

OTHER PUBLICATIONS

Machine English Translation, JP 2005-184685 (Jul. 7, 2005).*

(Continued)

*Primary Examiner* — Nelson D. Hernández Hernández
(74) *Attorney, Agent, or Firm* — Wenderoth, Lind & Ponack, L.L.P.

(57) ABSTRACT

An imaging apparatus wherein a captured image is subjected to a rotational transform so as to correct the inclination of one or more subjects in the captured image. The imaging apparatus defines, with reference to a physical inclination detected by a sensor, an angle range in which the image is to be processed. The imaging apparatus then processes the captured image and detects lines therein and inclination angles thereof. The imaging apparatus then creates histograms indicative of frequency distributions of the inclination angles of those lines, and selects, in the created histograms, an inclination angle having a frequency that satisfies a predetermined criterion, as a rotational angle to be used for the rotational transform.

19 Claims, 25 Drawing Sheets

FOREIGN PATENT DOCUMENTS

| | | |
|---|---|---|
| JP | 2006-245726 | 9/2006 |
| JP | 2006-318151 | 11/2006 |
| WO | 2006/082928 | 8/2006 |

OTHER PUBLICATIONS

Supplementary European Search Report issued Jun. 7, 2010 in EP 08 76 4036.

Japanese Office Action issued Nov. 8, 2011 in Japanese Patent Application No. 2009-520294.

International Search Report issued Jul. 15, 2008 in International (PCT) Application No. PCT/JP2008/001439.

Tsai, R. T., An Efficient and Accurate Camera Calibration Technique for 3D Machine Vision, *IEEE Conference on Computer Vision and Pattern Recognition*, 1986, pp. 364-374.

\* cited by examiner

FIG.16

Difference between angles (°)

| Sensor angle (°) | -5 | -4 | -3 | -2 | -1 | 0 | 1 | 2 | 3 | 4 | 5 |
|---|---|---|---|---|---|---|---|---|---|---|---|
| 0 | 5E-07 | 6E-05 | 0.003 | 0.0466 | 0.2414 | 0.4177 | 0.2414 | 0.0466 | 0.003 | 6E-05 | 5E-07 |
| 1 | 1E-06 | 0.0001 | 0.0044 | 0.054 | 0.242 | 0.3989 | 0.242 | 0.054 | 0.0044 | 0.0001 | 1E-06 |
| 2 | 4E-06 | 0.0003 | 0.0062 | 0.0611 | 0.2415 | 0.3818 | 0.2415 | 0.0611 | 0.0062 | 0.0003 | 4E-06 |
| 3 | 1E-05 | 0.0004 | 0.0083 | 0.068 | 0.2403 | 0.366 | 0.2403 | 0.068 | 0.0083 | 0.0004 | 1E-05 |
| 4 | 2E-05 | 0.0007 | 0.0107 | 0.0744 | 0.2384 | 0.3515 | 0.2384 | 0.0744 | 0.0107 | 0.0007 | 2E-05 |
| ⋮ | ⋮ | ⋮ | ⋮ | ⋮ | ⋮ | ⋮ | ⋮ | ⋮ | ⋮ | ⋮ | ⋮ |
| 86 | 0.0483 | 0.0587 | 0.0682 | 0.0759 | 0.081 | 0.0828 | 0.081 | 0.0759 | 0.0682 | 0.0587 | 0.0483 |
| 87 | 0.0484 | 0.0585 | 0.0678 | 0.0754 | 0.0803 | 0.082 | 0.0803 | 0.0754 | 0.0678 | 0.0585 | 0.0484 |
| 88 | 0.0484 | 0.0583 | 0.0674 | 0.0748 | 0.0796 | 0.0812 | 0.0796 | 0.0748 | 0.0674 | 0.0583 | 0.0484 |
| 89 | 0.0484 | 0.0581 | 0.067 | 0.0742 | 0.0789 | 0.0805 | 0.0789 | 0.0742 | 0.067 | 0.0581 | 0.0484 |
| 90 | 0.0484 | 0.0579 | 0.0666 | 0.0737 | 0.0782 | 0.0798 | 0.0782 | 0.0737 | 0.0666 | 0.0579 | 0.0484 |

FIG.20A

Difference between angles(°)

| Sensor angle(°) | -4 | -3 | -2 | -1 | 0 | 1 | 2 | 3 | 4 |
|---|---|---|---|---|---|---|---|---|---|
| 0 | 1.E-04 | 0.004 | 0.054 | 0.242 | 0.399 | 0.242 | 0.054 | 0.004 | 1.E-04 |
| 1 | 2.E-04 | 0.005 | 0.056 | 0.242 | 0.395 | 0.242 | 0.056 | 0.005 | 2.E-04 |
| 2 | 2.E-04 | 0.005 | 0.057 | 0.242 | 0.391 | 0.242 | 0.057 | 0.005 | 2.E-04 |
| 3 | 2.E-04 | 0.006 | 0.059 | 0.242 | 0.387 | 0.242 | 0.059 | 0.006 | 2.E-04 |
| ⋮ | ⋮ | ⋮ | ⋮ | ⋮ | ⋮ | ⋮ | ⋮ | ⋮ | ⋮ |
| 87 | 0.022 | 0.059 | 0.120 | 0.185 | 0.213 | 0.185 | 0.120 | 0.059 | 0.022 |
| 88 | 0.022 | 0.059 | 0.121 | 0.184 | 0.212 | 0.184 | 0.121 | 0.059 | 0.022 |
| 89 | 0.022 | 0.060 | 0.121 | 0.184 | 0.211 | 0.184 | 0.121 | 0.060 | 0.022 |
| 90 | 0.023 | 0.060 | 0.121 | 0.183 | 0.210 | 0.183 | 0.121 | 0.060 | 0.023 |

FIG.20B

Difference between angles(°)

| Sensor angle(°) | -4 | -3 | -2 | -1 | 0 | 1 | 2 | 3 | 4 |
|---|---|---|---|---|---|---|---|---|---|
| 0 | 0.002 | 0.018 | 0.089 | 0.232 | 0.319 | 0.232 | 0.089 | 0.018 | 0.002 |
| 1 | 0.002 | 0.020 | 0.091 | 0.230 | 0.313 | 0.230 | 0.091 | 0.020 | 0.002 |
| 2 | 0.003 | 0.021 | 0.094 | 0.228 | 0.307 | 0.228 | 0.094 | 0.021 | 0.003 |
| 3 | 0.003 | 0.023 | 0.096 | 0.226 | 0.301 | 0.226 | 0.096 | 0.023 | 0.003 |
| ⋮ | ⋮ | ⋮ | ⋮ | ⋮ | ⋮ | ⋮ | ⋮ | ⋮ | ⋮ |
| 87 | 0.059 | 0.079 | 0.098 | 0.112 | 0.116 | 0.112 | 0.098 | 0.079 | 0.059 |
| 88 | 0.059 | 0.079 | 0.098 | 0.111 | 0.116 | 0.111 | 0.098 | 0.079 | 0.059 |
| 89 | 0.059 | 0.079 | 0.097 | 0.110 | 0.115 | 0.110 | 0.097 | 0.079 | 0.059 |
| 90 | 0.059 | 0.079 | 0.097 | 0.109 | 0.114 | 0.109 | 0.097 | 0.079 | 0.059 |

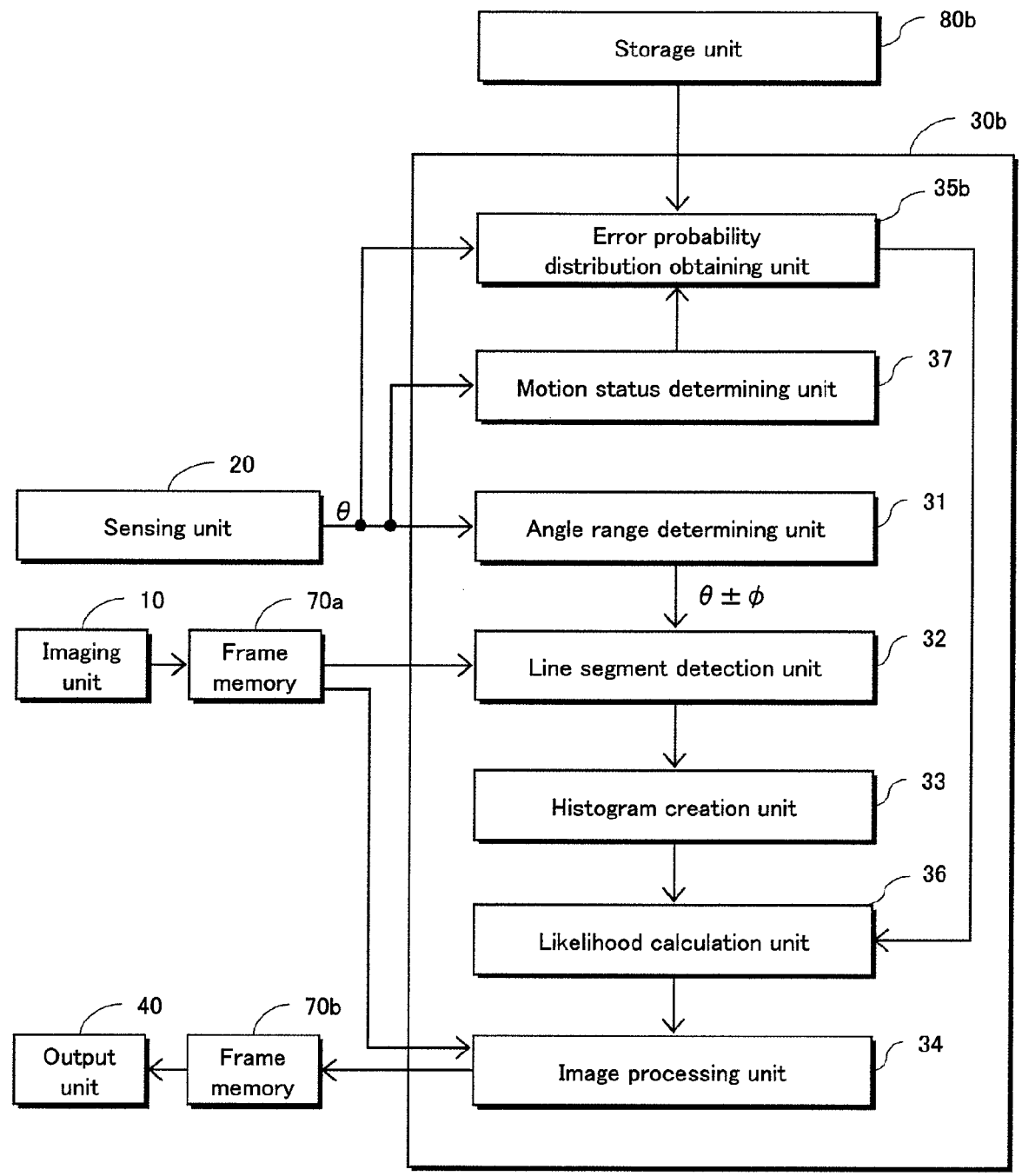

FIG.25

| -1 | -2 | -1 |
|----|----|----|
| 0  | 0  | 0  |
| 1  | 2  | 1  |

| -1 | 0 | 1 |
|----|---|---|
| -2 | 0 | 2 |
| -1 | 0 | 1 |

IMAGING APPARATUS, METHOD, SYSTEM INTEGRATED CIRCUIT, AND PROGRAM FOR CORRECTING INCLINATION OF SUBJECTS IN AN IMAGE

BACKGROUND OF THE INVENTION

1. Technical Field

The present invention relates to an imaging apparatus, and particularly to technology for image correct ion using a sensor.

2. Background Art

Imaging apparatuses (such as wearable cameras) that users can wear at all times on their body, thereby keeping a life log, or continual record of their day-to-day life experiences, have started to appear in recent years. A wearable camera is a small device that can be worn on the body. Wearable cameras are worn with a particular site on the body as a basis for support, e.g. by attaching a string to the camera and hanging it from the user's neck. Wearable cameras have the special capability of capturing images and sound without being expressly operated by hand or otherwise.

When one or more subjects are photographed by a wearable camera, however, the subjects are sometimes photographed when the wearable camera is tilted. This is caused by the wearable camera's position being misaligned as a result of the user's movements. Yet if photography proceeds when the wearable camera's position is not appropriately maintained, the subjects end up being photographed in an inclined position, resulting in an extremely unpleasant image for the user.

One known conventional way of correcting an image captured in an inclined position to a non-inclined image is to install an acceleration sensor in the wearable camera, and by measuring gravitational acceleration via the acceleration sensor, to detect the rotation angle of the wearable camera as compared to the earth's axis, correcting the inclination of the captured image in accordance with the detected rotation angle (see Patent Document 1 identified below). Other prior art is recorded in Patent Documents 2 through 4.

Patent Document 1: Japanese Patent Application Publication No. 2006-245726.
Patent Document 2: Japanese Patent Application Publication No. 2002-207232.
Patent Document 3: Japanese Patent Application Publication No. 2003-304486.
Patent Document 4: Japanese Patent Application Publication No. 2003-153072.

SUMMARY OF THE INVENTION

However, error is inherent to the housing of an acceleration sensor, and therefore correction in accordance with the detected rotation angle may still result in an unpleasant image for the user.

Furthermore, in principle both gravitational acceleration and acceleration produced by the movement of the camera are superimposed when detected by an acceleration sensor and cannot be distinguished. That is, the effects of acceleration produced by the movement of the camera can be considered to appear as an error. In the case of a wearable camera, which by virtue of being worn on the body is subject to harsh movements when pictures are taken, this means that it is difficult accurately to detect only gravitational acceleration with an acceleration sensor. At present, it is hard to improve the appearance of an image through conventional use of an acceleration sensor.

Technology known as camera shake correction does exist, whereby the movement of an imaging apparatus is detected by an angular velocity sensor, and according to the detected movement, the lens group is activated to correct blurring of an image. However, this is technology to correct changes in the relative movement of a camera during exposure of the camera's image sensor, and the basis for correction is the position of the camera at the moment the shutter clicks.

Thus, if an image needs to be corrected, for example, for a horizontal inclination, if the camera is already inclined horizontally at the moment the shutter clicks, no matter how much camera shake correction is applied, the captured image will not align horizontally.

In other words, camera shake correction technology can compensate for a relative angle produced by a camera's movement, but cannot compensate for an absolute angle, such as an angle with a horizontal reference.

It is an object of the present invention to provide an imaging apparatus that corrects the inclination of an image to a high degree of precision.

The above-described object is fulfilled by an imaging apparatus for correcting inclination of one or more subjects in a captured image by applying rotational transform to the captured image, the imaging apparatus comprising: an imaging unit; a sensor operable to detect physical inclination of the imaging unit; and a processing unit which, in accordance with the physical inclination detected by the sensor, is operable to select, from among a plurality of angular components in the one or more subjects in the captured image, an angular component satisfying a predetermined criterion, as a rotation angle for rotational transform.

With the afore-mentioned structure, the present invention does not use the physical inclination detected by the sensor directly for correction of the captured image, but rather uses it when selecting the rotation angle from among a plurality of angular components in the one or more subjects in the captured image. By selecting a rotation angle for rotational transform in accordance with the physical inclination detected by the sensor and on the angular components in the one or more subjects in the captured image, the quality of the image after correction is no longer influenced by error inherent to the sensor's housing.

Furthermore, when selecting the rotation angle, by selecting an angular component that satisfies a predetermined criterion as a rotation angle from among a plurality of angular components in the subjects in the captured image, the precision of correction can be improved.

The inclination angles of the lines in the captured image, the angles formed by the luminance gradients in the subjects in the captured image, etc. correspond to the angular components in the one or more subjects in the captured image.

The processing unit may be operable to perform image processing on the captured image in accordance with the physical inclination detected by the sensor, to detect the plurality of angular components in the one or more subjects in the captured image, to perform statistical processing on the plurality of angular components detected, and to select, from among the plurality of angular components, an angular component satisfying the predetermined criterion, as the rotation angle for rotational transform.

By performing image processing on the captured image in accordance with the physical inclination detected by the sensor, it is possible to detect a plurality of angular components in the one or more subjects in the captured image. Since statistical processing is performed on a plurality of angular components and an angular component that satisfies the predetermined criterion is selected as the rotation angle, it is possible to improve the degree of precision of correction.

Typically, a Hough transform is used for image processing. However, depending on the image to be processed there may be a vast number of characteristics, and as a result, the processing load for image processing may become heavy, and even if correction is carried out in accordance with the detected angle components, accurate correction may not always be possible; thus, there are problems both with processing load and with precision.

Therefore, when correcting an image, in order to improve the precision of correction while reducing processing load, it is preferable that the image processing detect lines in the captured image along with inclination angles thereof, that the image processing in accordance with the physical inclination be performed after determining an angle range for image processing with reference to the physical inclination, that the statistical processing create a histogram indicating a frequency distribution of the plurality of angular components, and that among the plurality of angular components, angular components that satisfy the predetermined criterion have, in the created histogram, a predetermined frequency.

In this way, the physical inclination detected by the sensor can be used as a basis for an angle range when detecting lines.

Since the image processing unit does not detect all of the lines in an image, but rather lines in the angle range, it is possible both to reduce the processing load for line detection while also improving precision by not detecting unnecessary lines.

The processing unit may be operable to perform image processing on the image captured by the imaging unit, detect the plurality of angular components in the one or more subjects in the captured image, perform statistical processing on the detected plurality of angular components in accordance with the physical inclination detected by the sensor, and select, from among the plurality of angular components, an angular component satisfying the predetermined criterion, as the rotation angle for rotational transform.

By performing image processing on the captured image, it is possible to detect a plurality of angular components in the one or more subjects in the captured image. As statistical processing is performed on the plurality of angular components in accordance with the physical inclination detected by the sensor, and as an angular component satisfying the predetermined criterion is selected as the rotation angle for rotational transform, it is possible to improve the degree of precision of correction.

The plurality of angular components in the one or more subjects in the captured image may be angles formed by luminance gradients in the one or more subjects in the captured image, the statistical processing may create a histogram indicating a frequency distribution of the plurality of angular components, and the statistical processing in accordance with the physical inclination may be performed after determining an angle range for statistical processing with the physical inclination as a reference.

In this way, the physical inclination detected by the sensor can be used as a basis for an angle range when creating a histogram. Since the histogram is not created for all of the angles formed by luminance gradients in one or more subjects in the captured image, but rather the histogram is created over the angle range, it is possible to exclude unnecessary angular components and to improve correction precision.

The correction processing unit may select, as the rotation angle for rotational transform, an angular component that has a highest frequency in the histogram from among the angular components having a predetermined frequency.

In this way, as the angular component that has the highest frequency in the histogram is selected as the rotation angle for rotational transform, it is possible to improve the reliability of correction.

When the angular component satisfying the predetermined criterion does not exist, the processing unit may select an inclination detected by the sensor as the rotation angle for rotational transform.

In this way, when the angular component satisfying a predetermined criterion does not exist, i.e. when the reliability of the plurality of angular components in the one or more subjects in the captured image is low, it is possible to improve the reliability of correction since the inclination detected by the sensor is selected as the rotation angle for rotational transform.

The processing unit may further include a detection unit operable to detect a particular subject in the captured image, and when the angular component satisfying the predetermined criterion does not exist, the processing unit may select an inclination of the particular subject as the rotation angle for rotational transform.

In this way, when the angular component satisfying the predetermined criterion does not exist, i.e. when the reliability of the plurality of angular components in the one or more subjects in the captured image is low, it is possible to improve the reliability of correction since the inclination of a particular subject is selected as the rotation angle for rotational transform.

The processing unit may further include a position detection unit operable to detect a position of the apparatus, and when the angular component with the predetermined frequency does not exist, and the position detected by the position detection unit is a predetermined position, the correction processing unit may select an angular component that has a highest frequency in the histogram, as the rotation angle for rotational transform.

In this way, in addition to whether or not the predetermined criterion is satisfied, the rotation angle is chosen in accordance with whether or not the position detected by the position detection unit is a predetermined position, thereby making it possible to improve the reliability of correction.

The processing unit may further include: a storage unit storing an error distribution of each unit angle; and an error distribution obtaining unit operable to obtain from the storage unit, in accordance with the physical inclination detected by the sensor, the error distribution corresponding to the physical inclination, wherein the correction processing unit may select, as the rotation angle for rotational transform, an angular component corresponding to a greatest inclination likelihood from among inclination likelihoods calculated from the histogram and the error distribution obtained by the error distribution obtaining unit.

The imaging apparatus may also further include a storage unit storing a relational expression for an error distribution of each unit angle; and an error distribution calculation unit operable to calculate the error distribution from the relational expression in accordance with the physical inclination detected by the sensor, wherein the correction processing unit may select, as the rotation angle for rotational transform, an angular component corresponding to a greatest inclination likelihood from among inclination likelihoods calculated from the histogram and the error distribution calculated by the error distribution calculation unit.

In this way, as the rotation angle is selected reflecting the sensor's error distribution, it is possible to select the rotation angle to a higher degree of precision, and to perform correction to a higher degree of precision.

As explained above, however, when the acceleration sensor itself is subject to acceleration caused by the user's movements, then it is impossible to measure such acceleration separately from gravitational acceleration. Even if correction is performed in accordance with the detected angle, the resulting image may still be unpleasant for the user.

Therefore, in order to correct an image accurately even when the image was captured while the user was in motion, it is preferable that the storage unit store both an error distribution when the apparatus is at rest and an error distribution when the apparatus is in motion, and (i) that the error distribution obtaining unit determine a motion status of the apparatus in accordance with the physical inclination detected by the sensor, (ii) if the apparatus is at rest, the unit obtains the error distribution when at rest, whereas if the apparatus is in motion, the unit obtains the error distribution when in motion.

The storage unit may also store both a relational expression for an error distribution when the apparatus is at rest and a relational expression for an error distribution when the apparatus is in motion, and (i) the error distribution calculation unit may determine motion status of the apparatus in accordance with the physical inclination detected by the sensor, (ii) if the apparatus is at rest, the unit calculates an error distribution from the relational expression for the error distribution when at rest, whereas if the apparatus is in motion, the unit calculates an error distribution from the relational expression for the error distribution when in motion.

In this way, as the error distribution corresponding to the motion status of the imaging apparatus is obtained, even when the user is in motion it is possible to perform correction to a higher degree of precision.

The processing unit may further include a distortion correction unit operable to correct a distortion of the captured image, and the image processing unit may perform image processing on the captured image after correction.

In this way, even if distorted lines are captured due to image distortion originating in the optical system of the imaging apparatus, correct lines can be detected, and correction can be performed to a higher degree of precision.

When the correction processing unit indicates the frequency distribution of a plurality of angular components via the histogram, the unit may perform a weighting for frequency of each angular component, with the weighting increasing as length of the lines detected in the captured image increases.

In this way, if for example a conspicuous line stretching from one edge of the image to the other exists, increasing the weight of the line allows for stable selection of comprehensive angular components even in an environment with numerous short lines.

When the correction processing unit indicates the frequency distribution of a plurality of angular components via the histogram, the unit may perform a weighting for frequency of each angular component, with the weighting increasing as the lines detected in the captured image approach perpendicularity.

Since among the lines existing in an image, the lines for angles that are nearly perpendicular in the real world are highly reliable, by increasing the weighting for these lines, correction can be performed to a higher degree of precision.

When the correction processing unit indicates the frequency distribution of a plurality of angular components via the histogram, the unit can perform a weighting for frequency of each angular component, with the weighting increasing as a difference between the physical inclination detected by the sensor and the inclination angle of the lines detected in the captured image grows smaller.

In this way, by performing weighting in accordance with the difference between the physical inclination detected by the sensor and the inclination angle of the lines detected in the captured image, correction can be performed to a higher degree of precision.

BRIEF DESCRIPTION OF THE DRAWINGS

FIG. 15 shows a functional block diagram for the wearable camera 100a.

FIG. 16 shows an error probability distribution table.

FIG. 17 shows the detailed functions of the correction processing unit 30a.

FIG. 18 is a flowchart showing the operation of the wearable camera 100a.

FIG. 20A shows the error probability distribution table when the apparatus is at rest.

FIG. 20B shows the error probability distribution table when the apparatus is in motion.

FIG. 21 shows the detailed functions of the correction processing unit 30b.

FIG. 25 shows a Sobel filter.

Figure 1A:
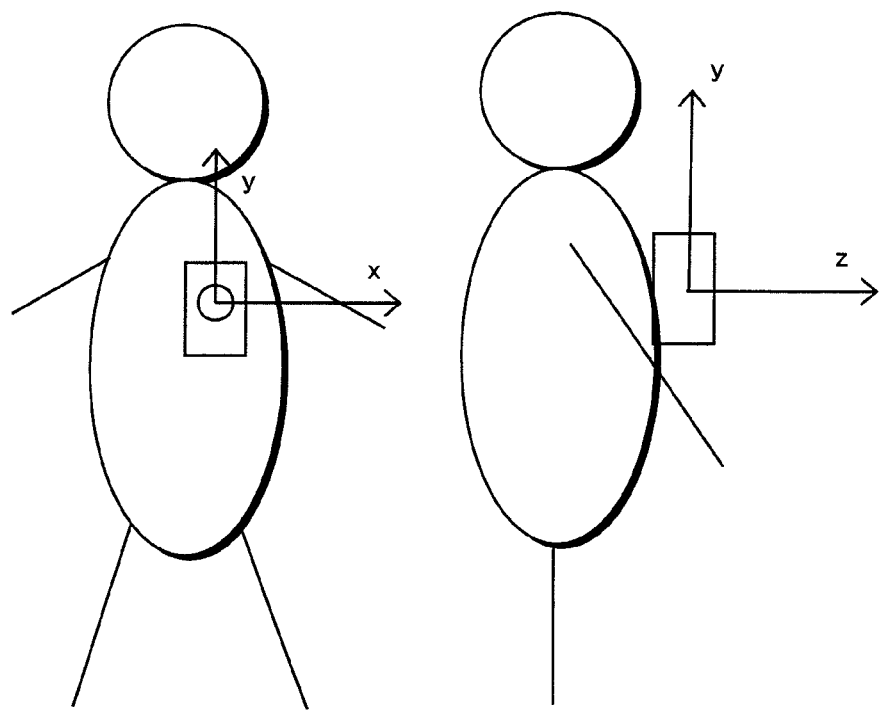
FIG. 1A shows a schematic view of the wearable camera when worn.

DESCRIPTION OF CHARACTERS 100, 100a, 100b wearable camera
10 imaging unit
20 sensing unit
30, 30a, 30b correction processing unit
31 angle range determining unit
32 line detection unit
33 histogram creation unit
34 image processing unit
35 error probability distribution obtaining unit
36 likelihood calculation unit
37 motion status determining unit
40 output unit
50 communication unit
60 display unit
70 frame memory
80, 80b storage unit

DETAILED DESCRIPTION OF THE INVENTION

Embodiment 1

Overview

Embodiment 1 of the present invention describes a wearable camera as an example of an imaging apparatus.

A wearable camera comprises a camera, microphone, and acceleration sensor, and the images and sounds captured by the camera and microphone are recorded on a recording medium.

Figure 1B:
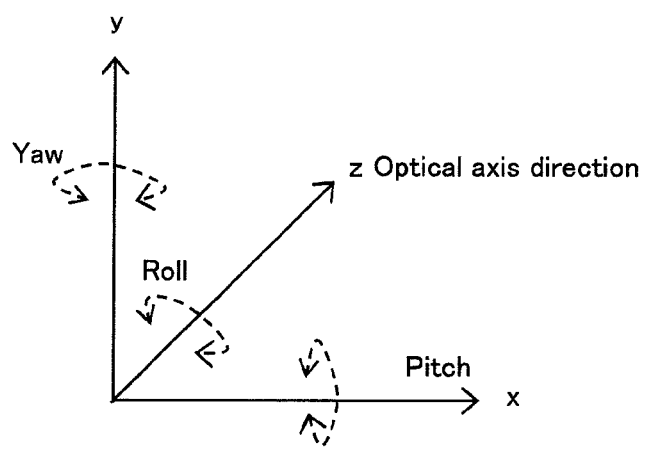
FIG. 1B shows a schematic view of the rotation axes of an image.

A characteristic of wearable cameras is that rotation occurs in the captured image due to bodily movements associated with the wearer's actions. With reference to FIGS. 1A and 1B, the types of rotation that occur are explained as follows. FIG. 1A is a schematic view of the wearable camera when worn. The wearable camera includes a fitting, to which a string is attached, and a particular site on the body serves as a basis for support, e.g. hanging the camera from the neck. As shown in FIG. 1A, when the x-axis is horizontal, the y-axis vertical, and the z-axis orthogonal to the plane formed by the x and y-axes, i.e. pointing in the direction of the wearable camera's optical axis, then rotation about the x-axis is called "pitch," rotation about the y-axis "yaw," and rotation about the z-axis "roll," as shown in FIG. 1B.

Figure 2A:
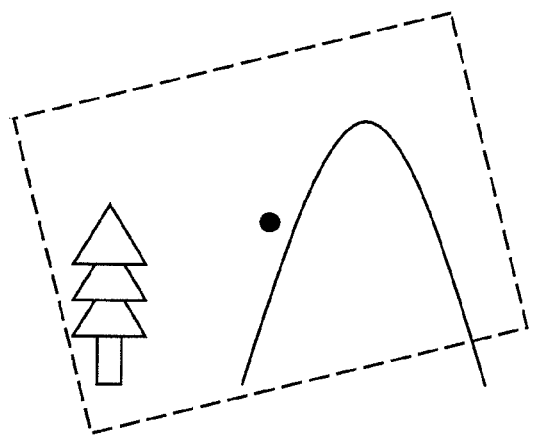
FIGS. 2A-2F show changes in an image in accordance with inclination of the receiving surface.
Figure 2D:
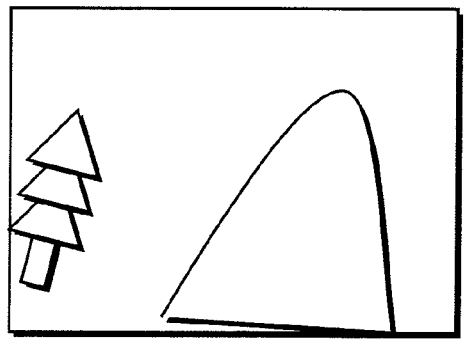
Figure 2B:
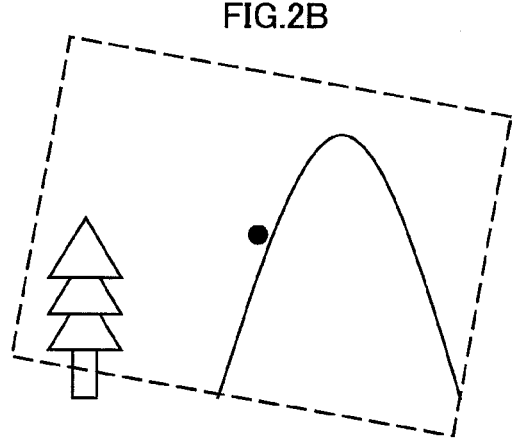
Figure 2E:
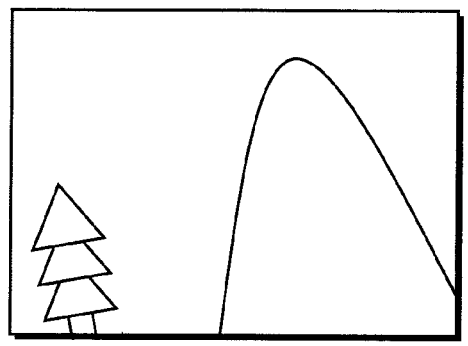
Figure 2C:
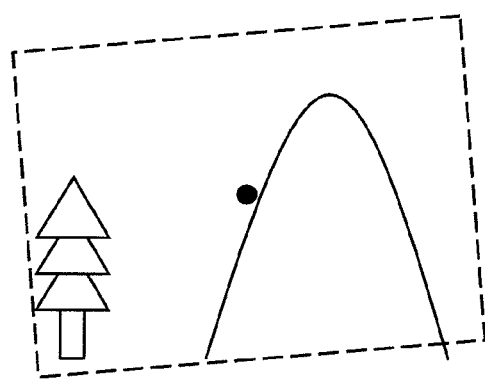
Figure 2F:
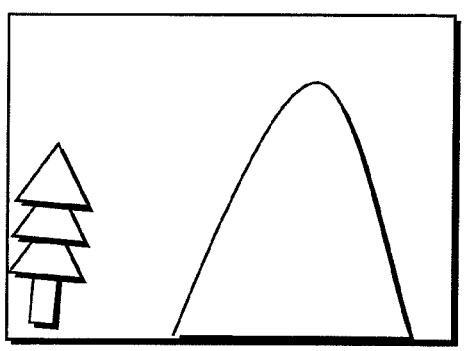

When the wearable camera rotates about the roll axis, the angle of view varies as shown in FIGS. 2A through 2C, while FIGS. 2D through 2F show the resulting captured images. The black dot in FIGS. 2A through 2C represents the center of rotation.

In addition to rotation in the roll direction, in practice rotation in the pitch direction and rotation in the yaw direction also occur; however, in Embodiment 1, only a method for correcting rotation in the roll direction, i.e. horizontal or vertical rotation about the optical axis in the plane formed by the x and y-axes, is described in particular. This is because, among the rotations about the three afore-mentioned axes, rotation in the roll direction causes the user to feel the most disconcerted when viewing an image, and correcting rotation in the roll direction most greatly affects image quality.

Consequently, in Embodiment 1 the wearable camera detects the rotation angle in the roll direction, and in accordance with the sensor's error distribution, determines the angle range with reference to the detected rotation angle. Within the determined angle range, lines are detected in the captured image, and the image is corrected in accordance with the inclination angle of the detected lines. In other words, the rotation angle detected by the sensor is not used directly for correction, but rather is used only to limit the range of line detection during image processing. Since the lines to be used in image correction are detected from the angle range in accordance with error distribution, and as actual correction is performed in accordance with the inclination angle of the detected lines, even if there is an error in the sensor itself, correction to a higher degree of precision is possible.

A detailed explanation of the wearable camera in Embodiment 1 is provided below with reference to figures.

<Structure of Wearable Camera 100>

Figure 3:
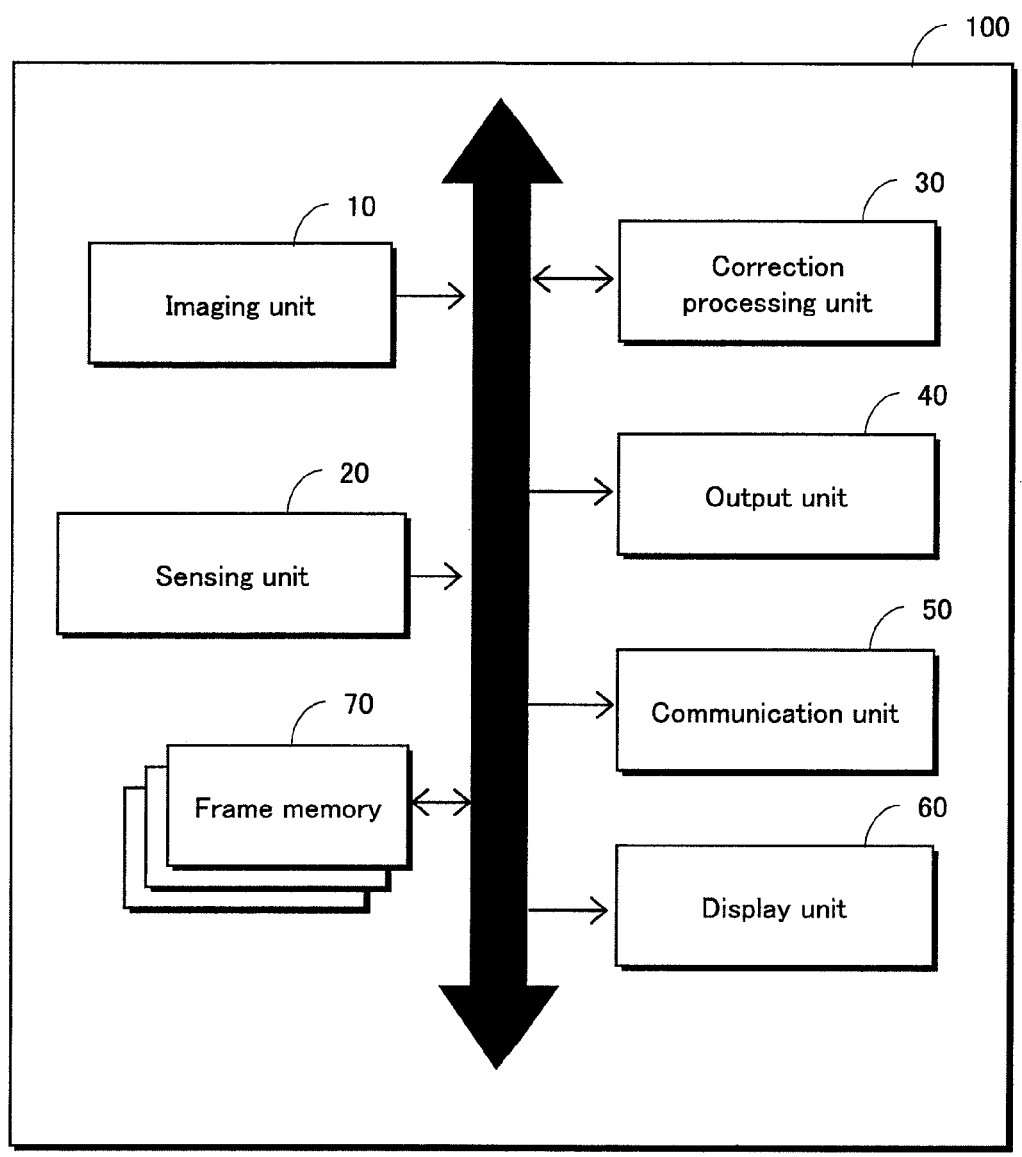
FIG. 3 shows a functional block diagram for the wearable camera 100.

FIG. 3 shows a functional block diagram for the wearable camera 100 in the present embodiment.

Concretely, the wearable camera 100 is a computer system comprising a microprocessor, ROM (Read Only Memory), RAM (Random Access Memory), DSP (Digital Signal Processor), etc. A computer program is stored on the ROM. The microprocessor operates in accordance with the computer program, thereby permitting the wearable camera 100 to complete its functions.

The wearable camera 100 comprises an imaging unit 10, a sensing unit 20, a correction processing unit 30, an output unit 40, a communication unit 50, a display unit 60, and a frame memory 70.

Concretely, the imaging unit 10 comprises an image sensor, such as a CCD (Charge Coupled Device) or CMOS (Complementary Metal-Oxide Semiconductor), and a lens unit. It has the function of capturing an image.

Concretely, the sensing unit 20 comprises a piezoresistive acceleration sensor, etc., and it detects the horizontal or vertical rotation angle about the optical axis of the receiving surface, which is the surface perpendicular to the optical axis. Details are explained in <Piezoresistive Acceleration Sensor> and <Method of Measuring Rotation Angle in the Roll Direction>.

In accordance with the rotation angle detected by the sensing unit 20, the correction processing unit 30 performs image processing on the image captured by the imaging unit 10 to correct the image. Details are explained in <Function of the Correction Processing Unit 30>.

Concretely, the output unit 40 comprises a recording medium, such as an SD memory card, and it records the images corrected by the correction processor 30, etc., on the recording medium.

Concretely, the communication unit 50 comprises a transmitter/receiver circuit including a modulation circuit, a demodulation circuit, etc., and via an antenna or the like, it transmits images captured by the imaging unit 10, corrected images, rotation angles detected by the sensing unit 20, etc. to an outside network.

Concretely, the display unit 60 comprises a liquid crystal display or the like, and it displays the images captured by the imaging unit 10 and the images corrected by the correction processing unit 30.

The frame memory 70 (70a, 70b, etc.) is dedicated memory for storing an image (one frame). For example, the frame memory 70 stores non-corrected images input from the imaging unit 10 and corrected images input from the image processing unit 34.

<Function of the Correction Processing Unit 30>

Figure 4:
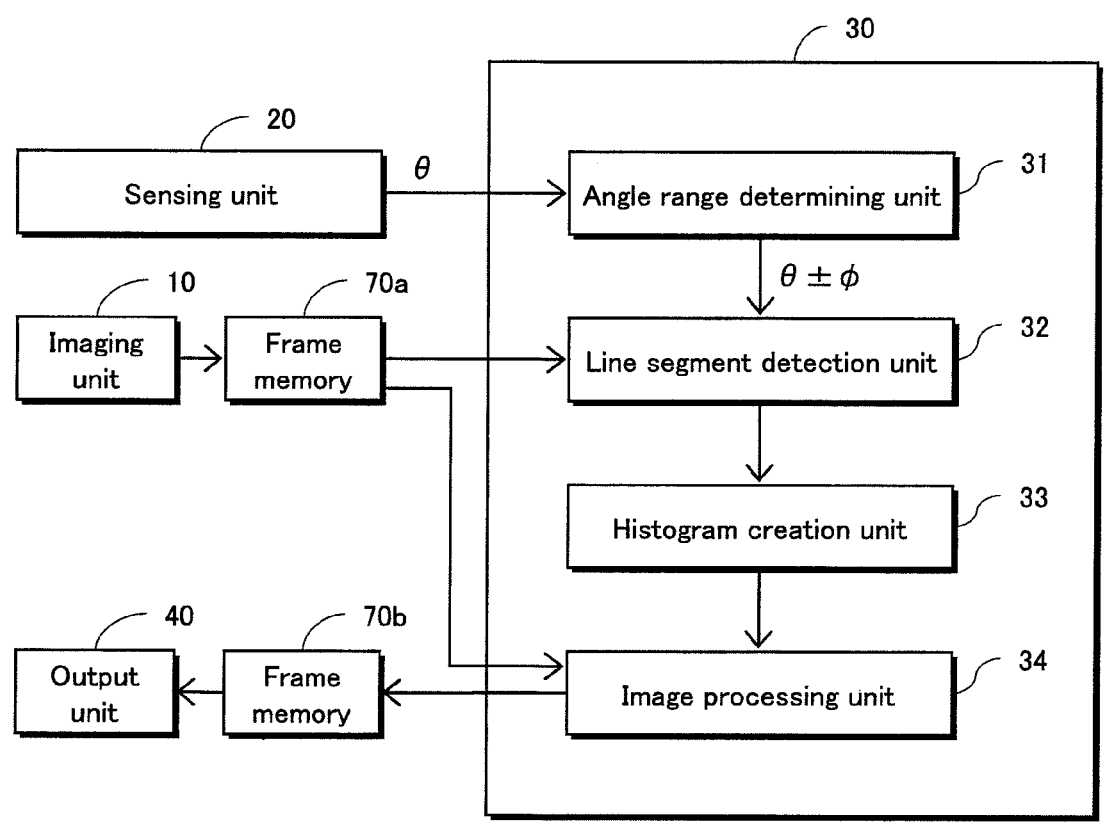
FIG. 4 shows a functional block diagram for the correction processing unit 30.

Now the detailed functions of the correction processing unit 30 are described. FIG. 4 shows a functional block diagram for the correction processing unit 30. The correction processing unit 30 comprises an angle range determining unit 31, a line detection unit 32, a histogram creation unit 33, and an image processing unit 34.

The angle range determining unit 31 determines the angle range θ±φ for detecting lines in accordance with the rotation angle input by the sensing unit 20 and transmits the angle range to the line detection unit 32. A concrete explanation is provided in <Angle Range>.

The line detection unit 32 obtains an image captured by the imaging unit 10 from the frame memory 70, detects, from among the lines comprising the obtained image, the lines within the angle range θ±φ input by the angle range determining unit 31 along with inclination angles thereof, and outputs the detected inclination angles to the histogram creation unit 33. A detailed explanation about the detection of lines is provided in <Hough Transform> and <Line Detection Processing>.

The histogram creation unit 33 counts the frequency of each line's inclination angle as input by the line detection unit 32 and creates an angle histogram indicating the frequency of each inclination angle. It then selects the most frequent inclination angle and transmits it to the image processing unit 34. The angle histogram referred to here is, concretely, a one-dimensional array.

When creating the angle histogram, either the horizontal or vertical direction can be referred to; the inclination angle that is ultimately selected corresponds to the rotation angle from whichever was used as a reference, the horizontal or vertical direction.

The image processing unit 34 obtains an image to be corrected from the frame memory 70a, performs image processing in accordance with the inclination angle input from the histogram creation unit 33, and stores the processed image in the frame memory 70b. A detailed explanation of image processing is provided in <Correction of Image Rotation>.

<Piezoresistive Acceleration Sensor>

Next, the piezoresistive acceleration sensor is described. The piezoresistive effect refers to the phenomenon of how, when the length or cross-sectional area of a conductor changes, its resistance changes. Specifically, the resistance R of a conductor with length L, cross-sectional area S, and resistivity p is shown in Equation 1.

$$R=\rho L/S \quad \text{(Equation 1)}$$

If this conductor is pulled along its length, with a resulting length of L' and cross-sectional area of S', the resulting resistance R' is shown in Equation 2.

$$R'=\rho L'/S' \quad \text{(Equation 2)}$$

If L'>L, and S'<S, then in accordance with Equations 1 and 2, R'>R. Therefore, it is clear that as a mechanical force is applied to the conductor, its resistance changes. A piezoresistive acceleration sensor is equipped with a piezoresistor that bends when subjected to forces that accompany acceleration, and it can measure a change in resistance that accompanies acceleration as the amount of change in voltage or current. In other words, the acceleration acting on the piezoresistor can be obtained from voltage or current values. Furthermore, by orienting piezoresistors in multiple directions, the acceleration in each direction can be measured.

<Method for Measuring Rotation Angle in the Roll Direction>

Figure 5:
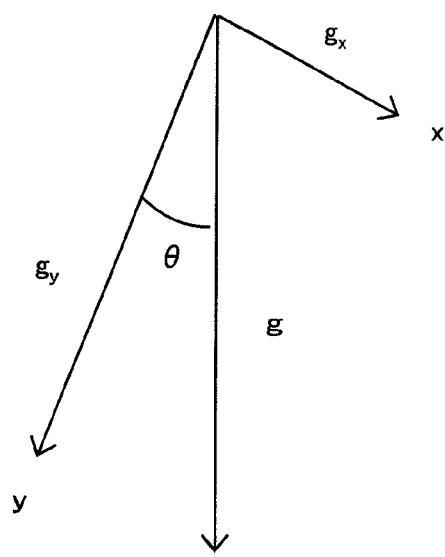
FIG. 5 shows a schematic view of the method for calculating the rotation angle about the roll axis using a biaxial acceleration sensor.

The actual method for measuring the rotation angle in the roll direction using a piezoresistive acceleration sensor is now explained with reference to FIG. 5. The acceleration in two directions, the x-axis and y-axis, which are orthogonal to each other, is measured using an acceleration sensor. If the y-axis is inclined θ degrees from the perpendicular direction, then the acceleration gy acting along the y-axis when at rest can be expressed as gy=g cos θ, where g represents gravitational acceleration. Similarly, the acceleration gx acting along the x-axis can be expressed as gx=g sin θ. Therefore, the inclination angle θ can be expressed in terms of gx and gy, as in Equation 3.

$$\theta=\tan^{-1}(gx/gy) \quad \text{(Equation 3)}$$

As shown in Equation 3, by seeking the ratio of the output from the acceleration sensor for each axis and the ratio's arctangent, the inclination angle θ can be detected.

<Angle Range>

Figure 6:
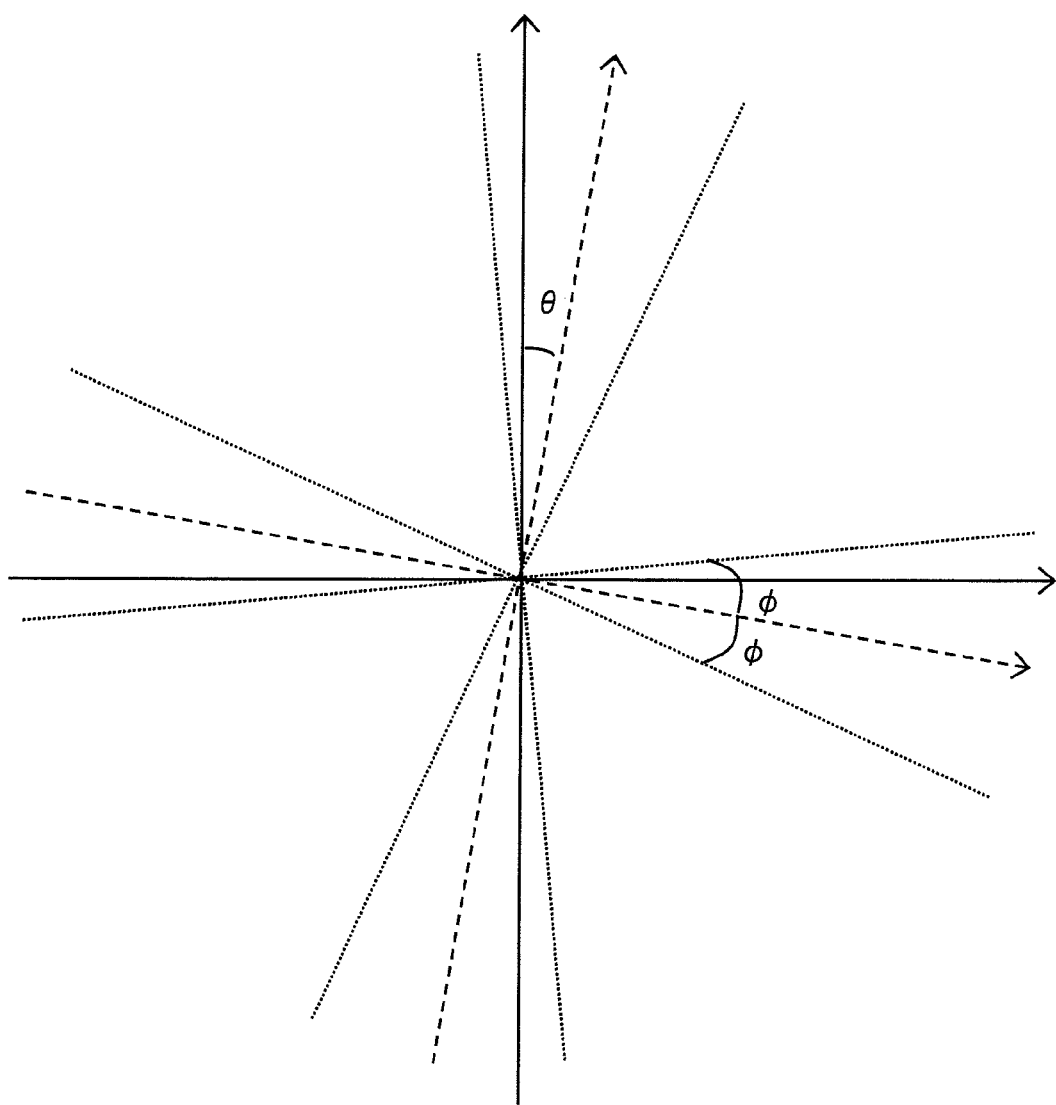
FIG. 6 shows a schematic view of the relationship between the sensor output and the angle range for detecting lines.

Next, the method for determining the angle range is described. When an inclination angle θ is detected by the sensing unit 20, the angle range determining unit 31 determines the angle range to be a range of ±φ from the angle θ, as shown in FIG. 6. The angle range of θ±φ can be determined for both the horizontal and vertical directions. Since the value of cp can be thought of as a margin for the output value θ from the acceleration sensor, the value of φ can, for example, be determined according to the sensor's error distribution. If the acceleration sensor's error follows a normal distribution with an average μ and standard deviation σ, then it is possible to let φ=aσ. Doing so has the effect of suppressing the following sort of disadvantage, which occurs when the value of φ is fixed.

Suppose φc is the fixed value's angle range, and φ the angle range determined by the acceleration sensor's error distribution. In the case where φc>φ, chances are high that the lines in a range larger than φ are not truly horizontal or vertical. Detecting these kinds of lines not only leads to an increase in wasted calculation, but can also have a detrimental effect on ultimate correction results. On the other hand, in the case where φc<φ, if the error is greater than cpc, it is impossible to search for lines that were supposed to be horizontal or vertical, and this too can have a detrimental effect on ultimate correction results.

In accordance with the nature of a standard normal distribution, if the value of "a" is set as 2, about 95% of the output is included within the error range, and if "a" is set at 3, about 99% is included. Therefore, what amount of error is permissible and to what degree the amount of calculation needs to be limited can be decided on appropriately according to circumstances, and a suitable value for "a" can be determined.

<Hough Transform>

Figure 7A:
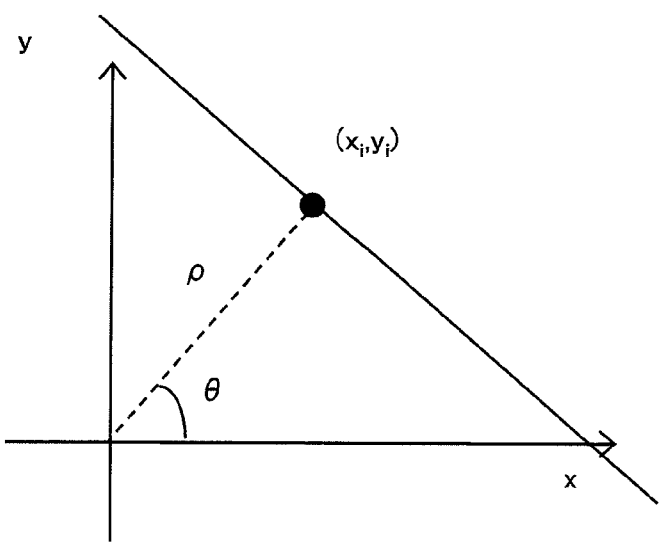
FIGS. 7A and 7B explain the principles of a Hough transform.

Now, the method for detecting lines from a captured image is described. A method known as a Hough transform is used here to detect lines. The following is a description of the detection method of lines via a Hough transform with reference to FIGS. 7A and 7B. In accordance with FIG. 7A, the straight lines traversing the point (xi, yi) in the image satisfy Equation 4, expressed in terms of parameters (ρ, θ).

$$\rho=xi \cos \theta + yi \sin \theta \quad \text{(Equation 4)}$$

Figure 7B:
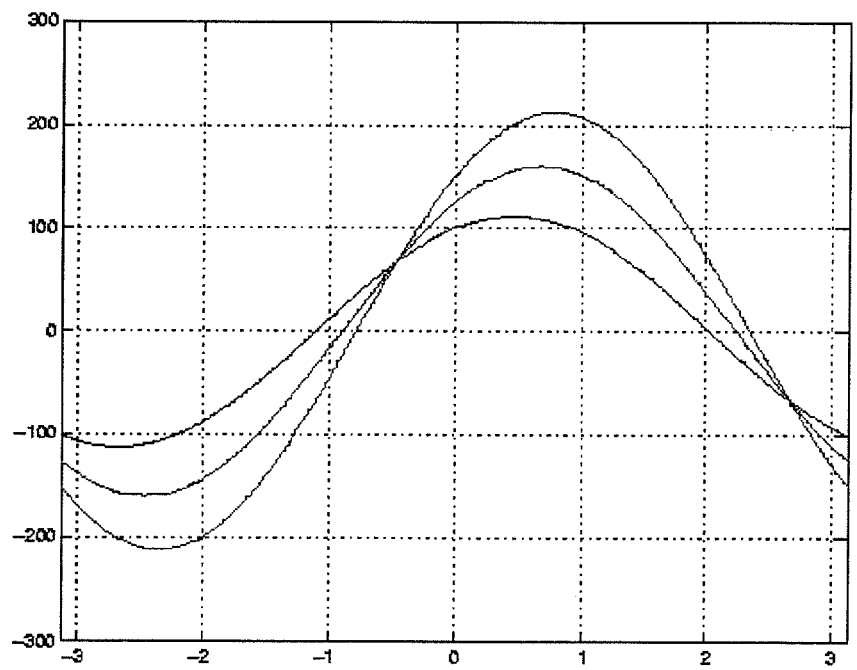

This means that the group of straight lines that traverse the point (xi, yi) can be mapped as a single curved line, as in FIG. 7B. At the same time, when multiple points along the same straight line are mapped in accordance with Equation 4, the resulting multiple curved lines intersect at a certain point. The parameters that correspond to this point of intersection express the straight line that traverses these points. In practice, the parameters (ρ, θ) are treated discretely. That is, the parametric space (ρ, θ) is divided into a standard size Δθ, and as θ is changed sequentially, the value of ρ is sought and its frequency counted. It is thought that the straight line that corresponds to a frequently occurring parameter set ($\rho$, $\theta$) has a high likelihood of actually existing in the image. The smaller the interval $\Delta\theta$ is, the greater the angle resolution for the detected straight line, allowing for expression of a more precise angle.

If $\Delta\theta$ is small, however, the value of $\rho$ is sought more frequently, which has the disadvantage of an accordingly lengthier processing time. Therefore, by allowing $\theta$ to vary in the angle range determined by the angle range determining unit 31, it is possible to reduce the number of processing operations while maintaining a high resolution.

A further problem is the memory required during line detection. In other words, in order to increase the precision of the inclination angle of the lines to be detected, $\theta$ has to be minutely configured and calculated, and subsequently the parameter plane has to be set large, requiring a large array memory.

Embodiment 1 limits the range for detection of lines to a range of $\pm\phi$ from the detected inclination angle $\theta$, thereby reducing the amount of memory needed.

<Correction of Image Rotation>

Next, image correction is explained. Correction of image rotation is performed as follows. Typically, if a point P=(x, y) in an image is expressed in the camera's XYZ coordinate system, a coordinate system with the camera at the center, as P1=(x1, y1, z1), then the relation expressed in Equation 5 below holds.

$$sP'=KP1'  \quad \text{(Equation 5)}$$

Here, P' and P1' are an expression of P and P1 respectively in homogenous coordinates, with P'=(x, y, 1) and P1'=(x1, y1, z1, 1). K is a 3×4 matrix known as an internal parameter matrix and is determined by the focal length, aspect ratio, coordinates of the image center, i.e. the intersection of the image plane and the optical axis, etc. Finally, "s" is a scaling parameter.

When the coordinates of P1 are expressed in another camera's coordinate system X'Y'Z' with P2=(x2, y2, z2), then the relation expressed in Equation 6 below holds.

$$P2'=[R]P1' \quad \text{(Equation 6)}$$

Here, P2' is an expression of P2 in homogenous coordinates, with P2'=(x2, y2, z2, 1). [R] is a 4×4 rotation matrix from P1 to P2. Furthermore, letting the point expressing P2 on the image coordinate system be Q=(u, v), then just as in Equation 5, the relation expressed in Equation 7 holds.

$$sQ'=KP2' \quad \text{(Equation 7)}$$

Here, Q' is an expression of Q in homogenous coordinates, with Q'=(u, v, 1). As long as the camera's internal parameters do not change, K remains constant. Summarizing these equations, the relation between P and Q expressed in Equation 8 holds.

$$Q'=K[R]K^{-1}P' \quad \text{(Equation 8)}$$

Figure 8:
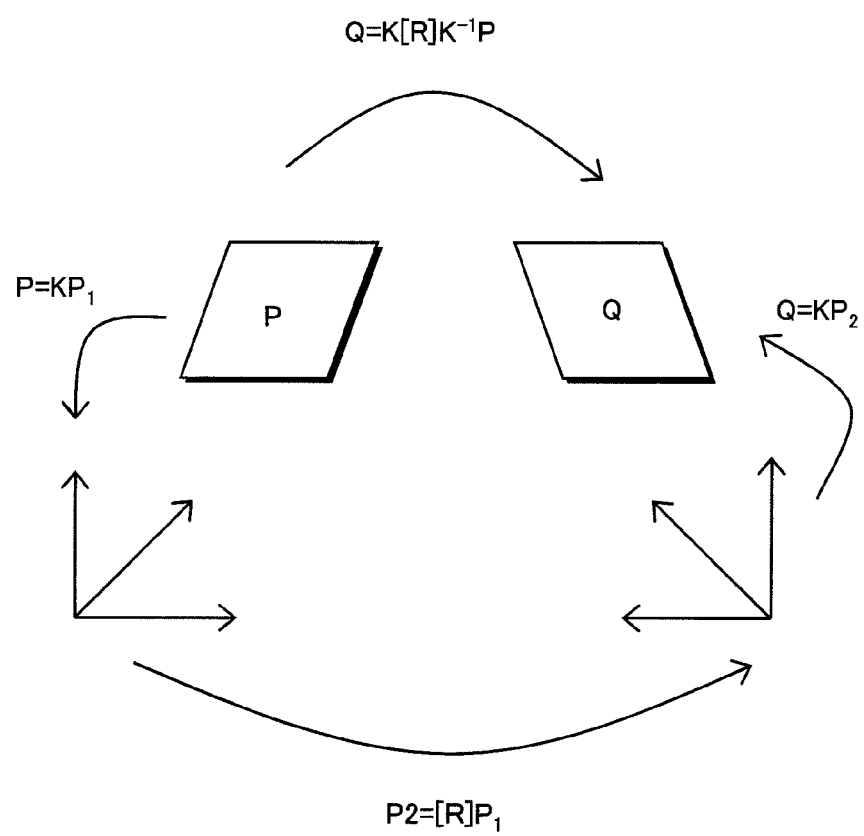
FIG. 8 shows a schematic view of the relations when associating an image photographed at a particular angle with an image photographed at a different angle.

Here, $K^{-1}$ is a reverse matrix of K. A change in the angle of view produced when the wearable camera's user moves corresponds to a transformation in the afore-mentioned camera coordinate system. Assuming the internal parameter matrix K to be constant, measuring the rotation from the time the previous image was captured to the time the next image is captured allows for mapping between the captured images. FIG. 8 summarizes the afore-mentioned relations. Note that instead of measuring rotation as the amount of change from the time of the previous captured image, rotation can be measured as the amount of change from any point of origin or coordinate axis.

<Sensor Reading Cycle and Timing of Image Processing>

Next, the sensor reading cycle and the timing of image processing are described. Ideally, the timing of the sensor output to be used in line detection will be synchronized with the time the image is captured.

With regards to the sensor reading cycle, if the sensor's signal is used directly, it is possible to obtain output from the sensor every 33 milliseconds (i.e. each frame). To reduce noise, for each frame the output from five sensors, for example, can be read, using the mean value as the sensor output value for the relevant frame.

Assuming use of a dedicated processor, such as a DSP, then image processing can be carried out, for example, once every five frames. In this case, the processing results once available correspond to the angles of the lines for the image from 200 milliseconds before, and they deviate slightly from the angle of the lines for the current image. If the movement during this period of time is presumed to be small, however, the deviation poses no problem.

In accordance with the above, assuming a photography rate of, for example, 30 frames a second, then sensor output is read every frame (33 milliseconds), and image processing carried out every five frames (200 milliseconds).

<Operation of the Imaging Apparatus>

Figure 9:
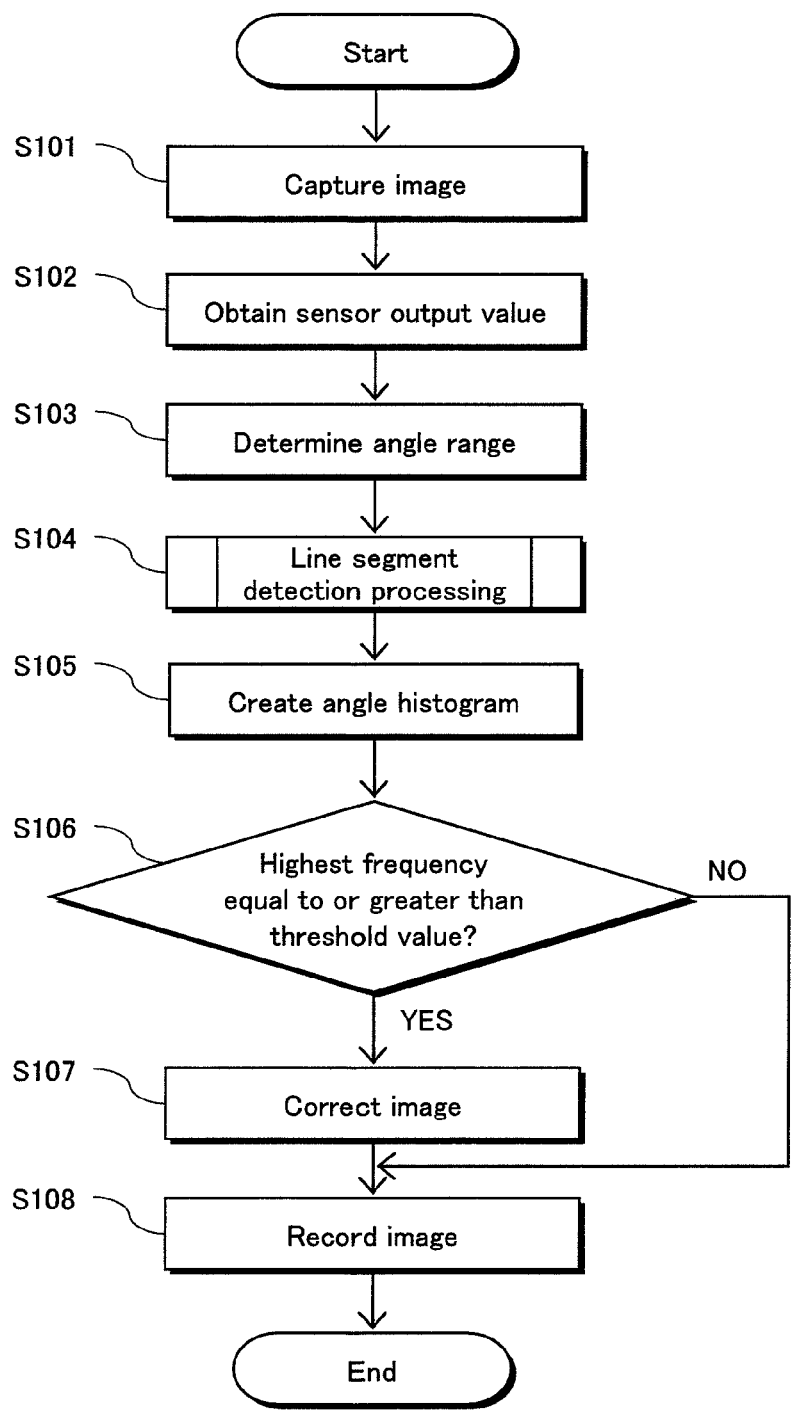
FIG. 9 is a flowchart showing the operation of the wearable camera 100.

FIG. 9 is a flowchart showing the operation of the wearable camera 100. First, the imaging unit 10 captures an image (step S101).

In synchrony with the image captured by the imaging unit 10, the sensing unit 20 detects the rotation angle (step S102), which indicates to what degree the receiving surface is rotated horizontally or vertically about the optical axis. Concretely, it seeks the rotation angle via Equation 3, using the output values for each axis from the acceleration sensors.

In accordance with the detected rotation angle, the angle range determining unit 31 determines the angle range for detecting lines (step S103). Concretely, with the rotation angle obtained from the sensing unit 20 defined as $\theta$, it sets the angle range as $\theta\pm\phi$.

Next, the line detection unit 32 detects one or more lines in the determined angle range from within the captured image (step S104). Concrete details about processing are described in <Line Detection Processing>.

The histogram creation unit 33 counts the inclination angle of each detected line and creates an angle histogram indicating the frequency of each angle (step S105).

The image processing unit 34 determines whether the highest frequency in the created angle histogram is equal to or above a predetermined threshold value or not (step S106). If it is above the predetermined threshold value ("Yes" for step S106), it determines the inclination angle corresponding to the highest frequency to be the actual rotation angle, and it uses this angle for correction processing (step S107). Concretely, it performs correction by applying rotation to the captured image in the opposite direction of the inclination angle that was deemed to be the actual rotation angle, in order to counteract the inclination. If the highest frequency is less than the predetermined threshold value ("No" for step S106), then processing proceeds to step S108 without correction being performed.

The output unit 40 records the image on the recording medium (step S108).

The above is an outline of the wearable camera 100's operation. As stated above, the rotation angle detected by the sensor is not used directly for correction, but rather the rotation angle detected by the sensor is used to limit the angle range when performing line detection processing; thus, the processing load for line detection is reduced, while also allowing for improved precision.

<Line Detection Processing>

Figure 10:
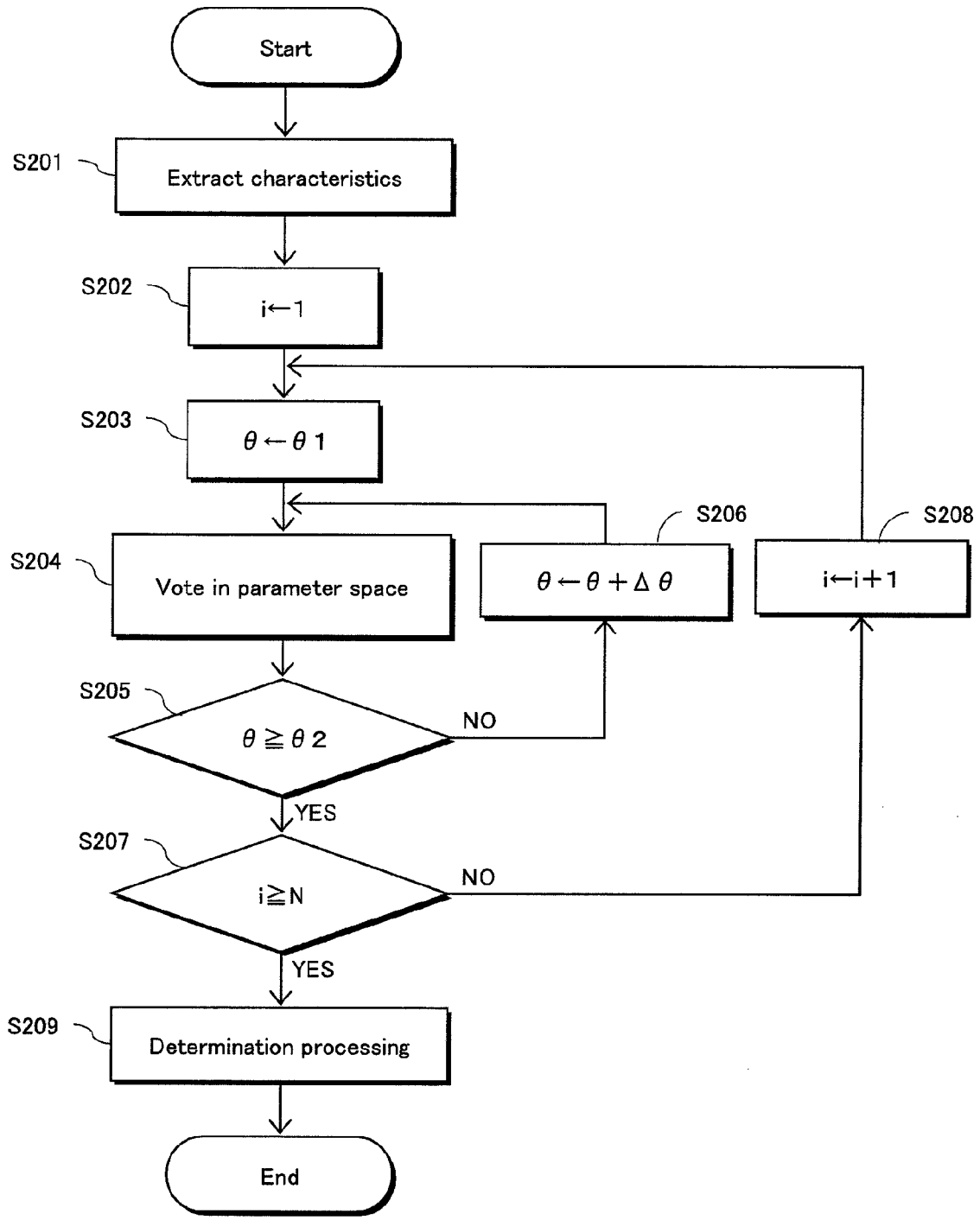
FIG. 10 is a flowchart showing the steps in line detection processing via a Hough transform.

With reference to FIG. 10, the concrete steps in line detection processing via a Hough transform are described next. FIG. 10 is a flowchart showing the steps in line detection processing via a Hough transform. In this flowchart, θ1 and θ2 are, respectively, the lower limit (θ−φ) and upper limit (θ+φ) of the angle range determined by the angle range determining unit 31 as in accordance with the angle θ detected by the sensing unit 20. The variable "i" indicates one extracted characteristic, whereas N indicates the total number of characteristics.

First, the line detection unit 32 extracts from within the captured image the characteristics, or points for which the likelihood of lines existing is thought to be high (step S201). Existing methods for extracting characteristics, such as applying a filter that detects the image's edge, can be used.

The value of the variable "i," used to identify the $n^{th}$ characteristic, is initially set at 1 (step S202), and the value of the Hough transform parameter θ is initially set at θ1 (step S203).

Next, votes are cast in the cells of the two-dimensional array associated with the parameter space (step S204). Concretely, for the $i^{th}$ extracted characteristic (xi, yi), the value of ρ is calculated via Equation 4 in accordance with the value of the current angle θ, and the frequency of the corresponding address in the two-dimensional matrix associated with (ρ, θ) in the parameter space is increased by exactly one. By this sort of processing, for each address in the matrix, the frequency obtained for (ρ, θ) corresponding to that address is stored. In other words, by casting votes on all of the characteristics, a two-dimensional array U(ρ, θ) is created, and in accordance with this array, determination processing proceeds as described below, and lines are detected.

Next, the line detection unit 32 determines whether the angle θ has reached the upper limit of the angle range represented by the upper limit value θ2 or not (step S205). If it has not reached the upper limit value θ2 ("No" for step S205), then Δθ is added on to angle θ, and after this new angle θ has been established (step S206), operation returns to step S204.

If the upper limit value θ2 has been reached ("Yes" for step S205), then the unit determines whether the value of "i" has reached N or not (step S207). If it has not reached N ("No" for step S207), then "i" is incremented by one (step S208), and processing returns to step S203. If it has reached N ("Yes" for step S207), then determination processing is performed (step S209). Concretely, the unit first selects a parameter pair (ρ, θ) with a frequency larger than a predetermined threshold value and determines whether characteristics equal to or greater than a predetermined number exist sequentially along a straight line corresponding to the selected parameter (ρ, θ) or not. When characteristics equal to or greater than a predetermined number exist, a line is determined to actually exist. This is because not every pixel along a straight line is necessarily a characteristic; characteristics may exist intermittently. At the moment a line is deemed actually to exist, the length of the line is determined from the starting point and ending point of the sequential characteristics. Once this processing has been performed for every selected pair (ρ, θ), determination processing is complete.

Concrete Example

The effects of limiting the angle range for detecting lines are now described using a concrete example (FIGS. 11 through 14). FIG. 11A shows an image (uncorrected image) captured by the imaging unit 10. The captured image is inclined approximately 20°.

Figure 11A:
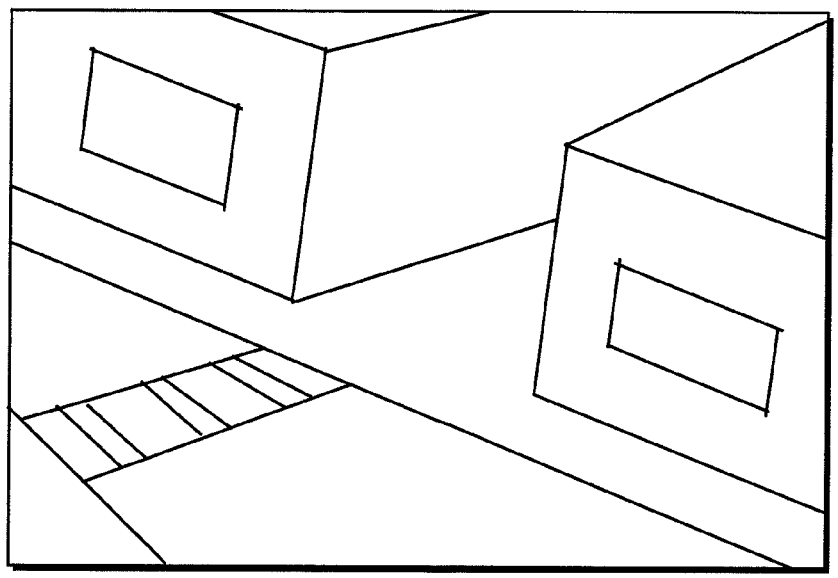
FIG. 11A shows an image (uncorrected image) captured by the imaging unit 10.
Figure 11B:
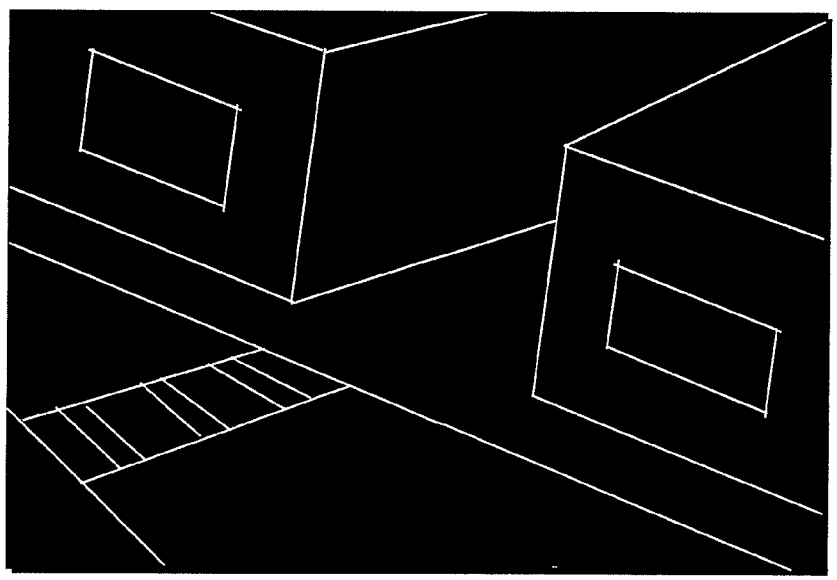
FIG. 11B shows an image with all of the lines detected in the image shown in FIG. 11A.

First, the case when the angle range for detecting lines is not limited is presented. In this case, line detection processing will detect all of the lines shown in the image in FIG. 11A, as shown in FIG. 11B. The resulting frequencies of inclination angles of lines in a range of −90° to 90° are shown in an angle histogram, as indicated in FIG. 12B. The inclination angle that should be used for image correction is 20°, but as FIG. 12B shows, an angle of nearly −90° is actually the most frequent angle. Therefore, correction will be performed in accordance with the inclination angle with the highest frequency, i.e. the inclination angle of nearly −90°.

Figure 12A:
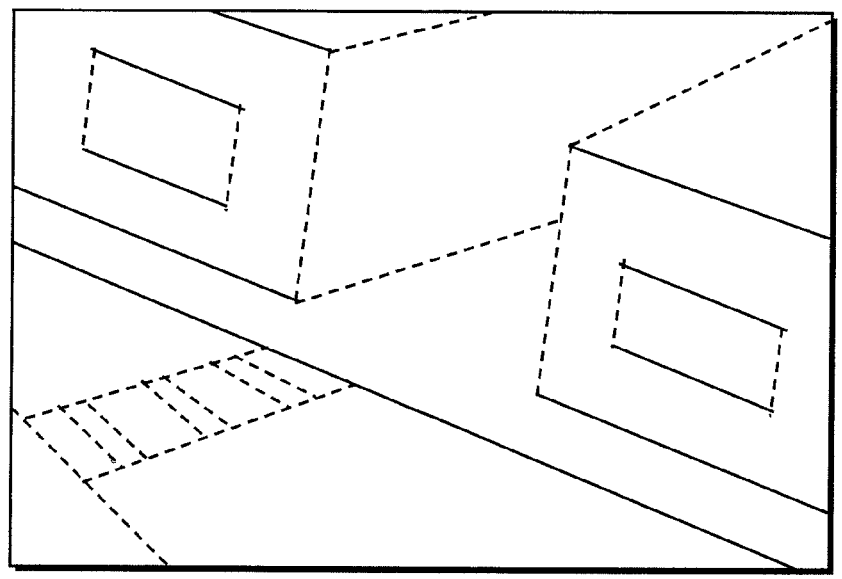
FIG. 12A shows the inclination angle with the highest frequency when all of the lines in the image are detected.
Figure 12B:
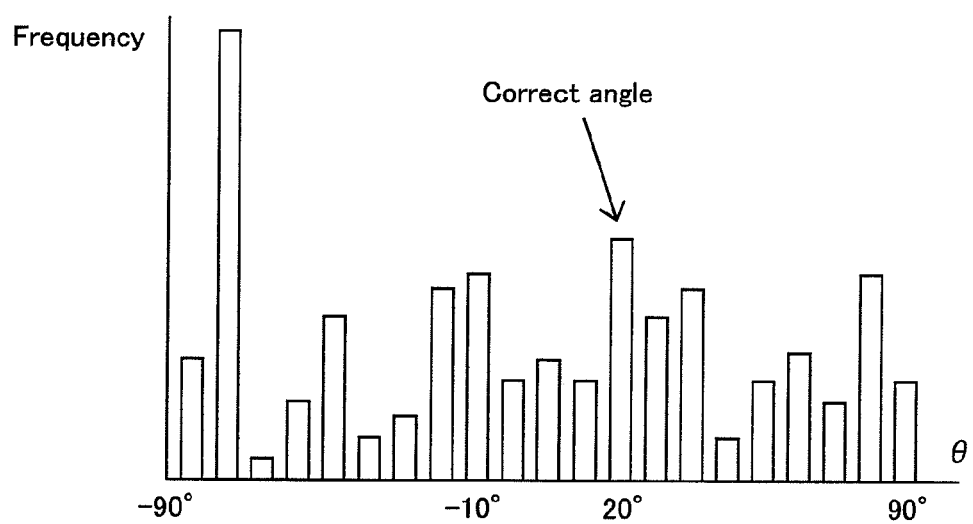
FIG. 12B shows the angle histogram corresponding to FIG. 12A.

The inclination angle of the lines drawn in FIG. 12A as solid lines corresponds to the most frequent inclination angle (i.e., the inclination angle of nearly −90°. These lines, however, appear inclined in the image because the outer edges of buildings, roads, etc., which should be horizontal, were photographed from an angle. Thus, even if these lines are made perfectly level in the image, i.e. if the image is rotated to make the lines horizontal, the actual horizon will not align with the image, meaning the image will still be inclined.

Figure 13A:
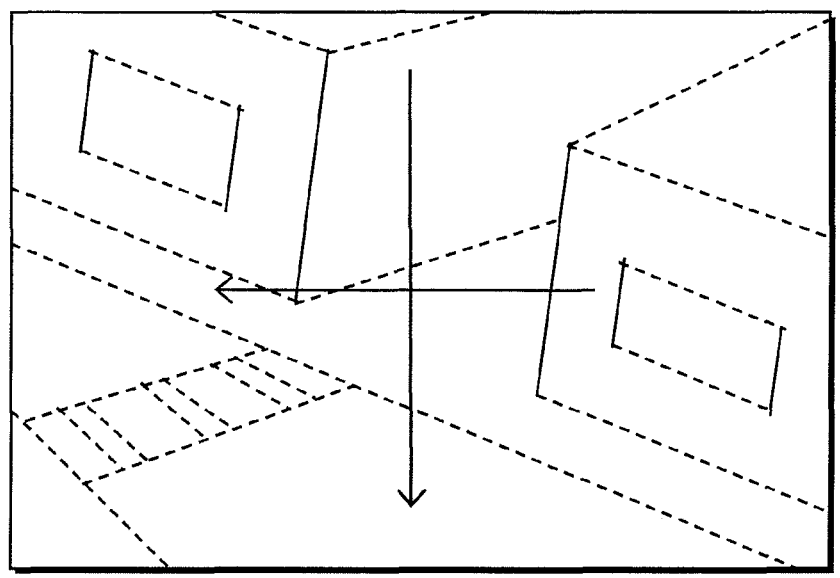
FIG. 13A shows the inclination angle with the highest frequency when the line detection range is limited.
Figure 13B:
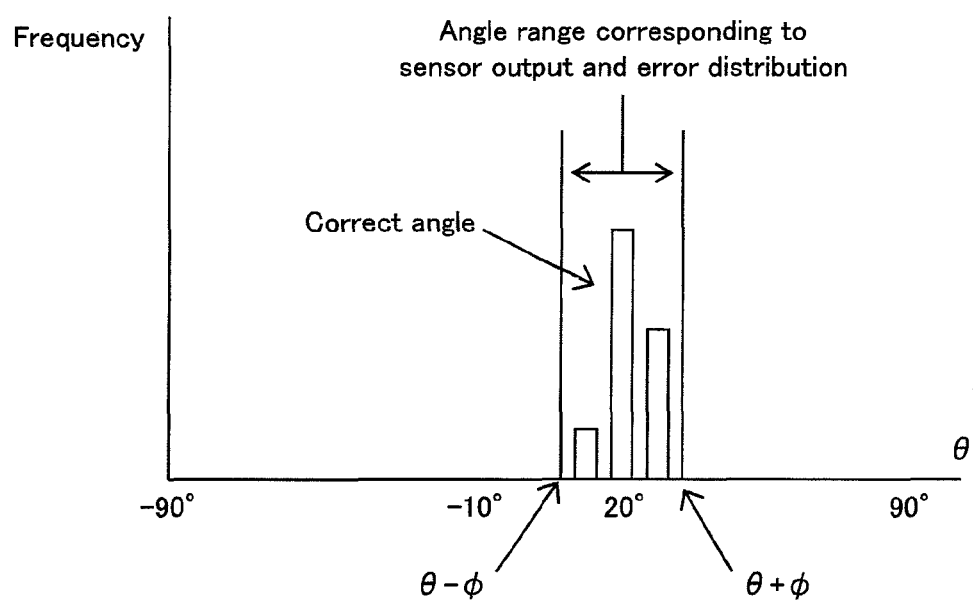
FIG. 13B shows the angle histogram corresponding to FIG. 13A.

Conversely, when the angle range for detecting lines is limited, only one or more lines within the range determined by the angle range determining unit 31 are detected, and as shown in FIG. 13B, an angle histogram is created indicating the inclination angle of each line within the specified range. As FIG. 13B shows, by limiting the range for detecting lines, the inclination angle in the angle histogram with the highest frequency is not the inclination angle of nearly −90°, which had the highest frequency in FIG. 12B, but rather the inclination angle of 20°, which is the angle that should be used for image correction.

Figure 14:
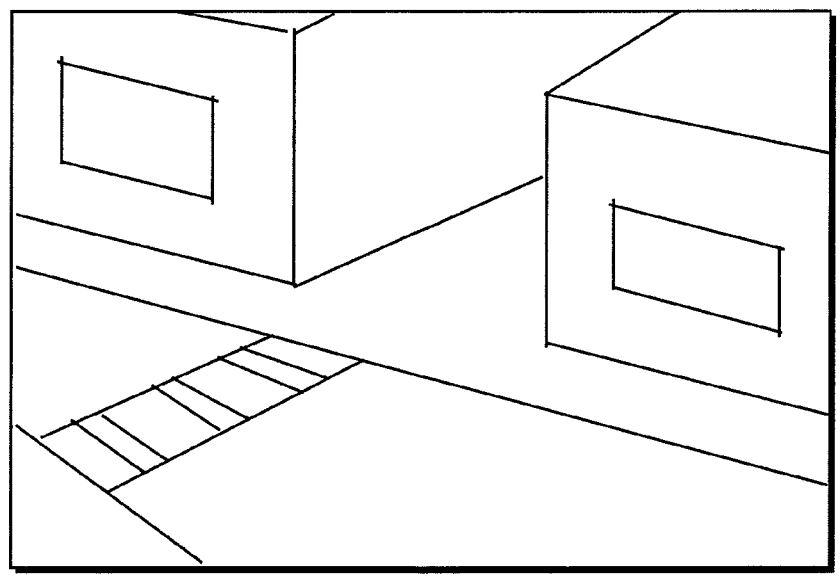
FIG. 14 shows an image after correction.

As FIG. 13A shows, the acceleration sensor determines that the direction indicated by the downward arrow is vertically downward, and the inclination angle of the lines (excluding the arrows) drawn as a solid line in FIG. 13A corresponds to the angle with the greatest frequency. By making these lines vertical within the image, i.e. by rotating the image so that the lines become perpendicular, then the inclination angle can be corrected accurately as shown in FIG. 14.

In this way, line detection processing does not detect all of the lines in an image, but rather detects only the lines within a range of ±φ from the inclination angle θ detected by the sensing unit 20. This both improves processing efficiency while also increasing precision by excluding beforehand lines that could adversely affect the final estimation of the rotation angle.

As shown above, in Embodiment 1, the range for detecting lines is determined in accordance with the sensor's error distribution, and detecting lines from within that range both improves processing efficiency and, by detecting lines from within a range in accordance with error distribution, also allows for image correction to a high degree of precision even if there is an error in the sensor.

This differs greatly from the conventional way of using sensor output. Since sensor output is only used as a reference for the angle range when detecting lines, and as image correction is carried out depending on the angle with the highest frequency in the histogram, the quality of the image after correction is no longer influenced by error inherent to the sensor's housing.

Embodiment 2

In Embodiment 2, the inclination angle is estimated using a likelihood function.

<Structure>

Figure 15:
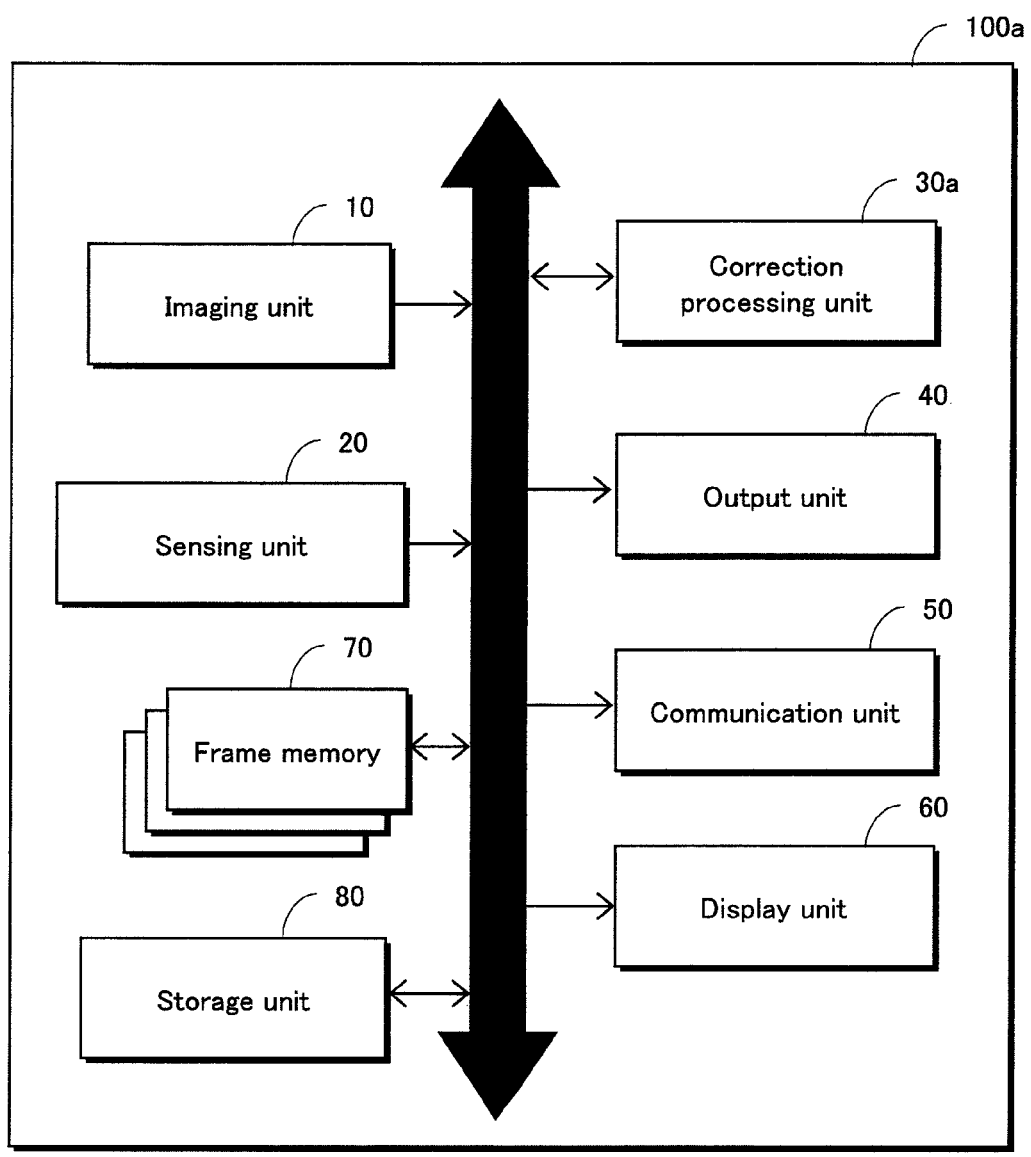

The wearable camera in Embodiment 2 is described below. FIG. 15 shows a functional block diagram for the wearable camera 100a in Embodiment 2. The wearable camera 100a comprises the wearable camera 100 in Embodiment 1 with the addition of a storage unit 80, and with correction processing unit 30 replaced by correction processing unit 30a. The function of other units is the same as the wearable camera 100 in Embodiment 1. Only the areas that differ from the wearable camera 100 are described below.

The storage unit 80 stores the error probability distribution data for each angle from the acceleration sensor included in the sensing unit 20. When consulted by the correction processing unit 30a, the storage unit 80 outputs the error probability distribution data to the correction processing unit 30a. The error probability distribution for each angle is pre-measured, for example, before the wearable camera is shipped, and is stored in a format that can be referred to later. FIG. 16. is an example of an error probability distribution table, showing the distribution probability for errors in sensor output values. For example, when the sensor's output angle is two degrees, the probability that the error compared to the true value is θ degrees is 0.3818, and the probability of a one degree error is 0.2415.

Figure 17:
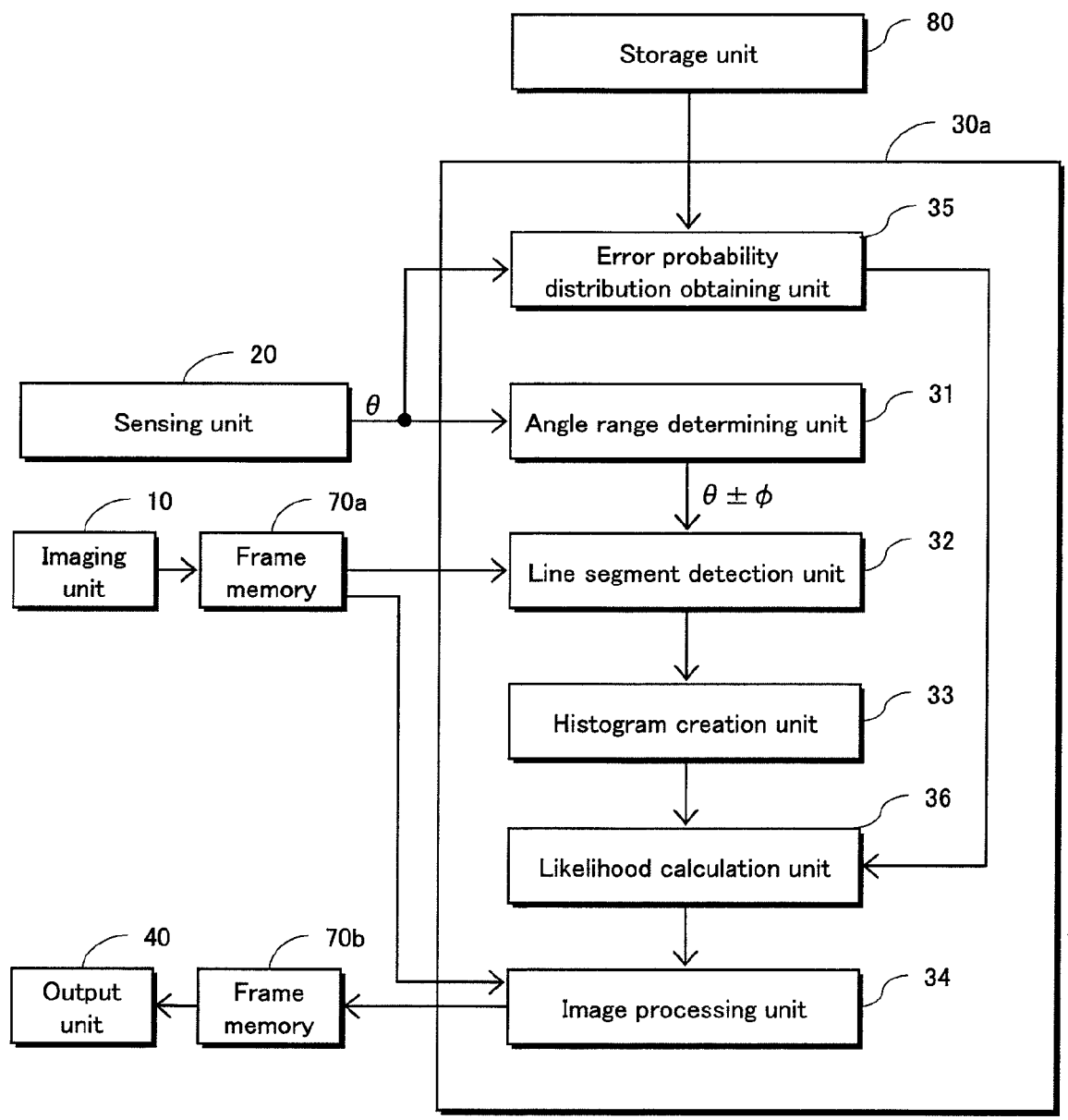

FIG. 17 shows the detailed functions of the correction processing unit 30a. The correction processing unit 30a comprises an error probability distribution obtaining unit 35, which obtains from the storage unit 80 the error probability distribution corresponding to the rotation angle θ detected by the sensing unit 20, and also a likelihood calculation unit 36, which calculates the angle likelihood from the error probability distribution and the angle histogram.

<Operation>

Figure 18:
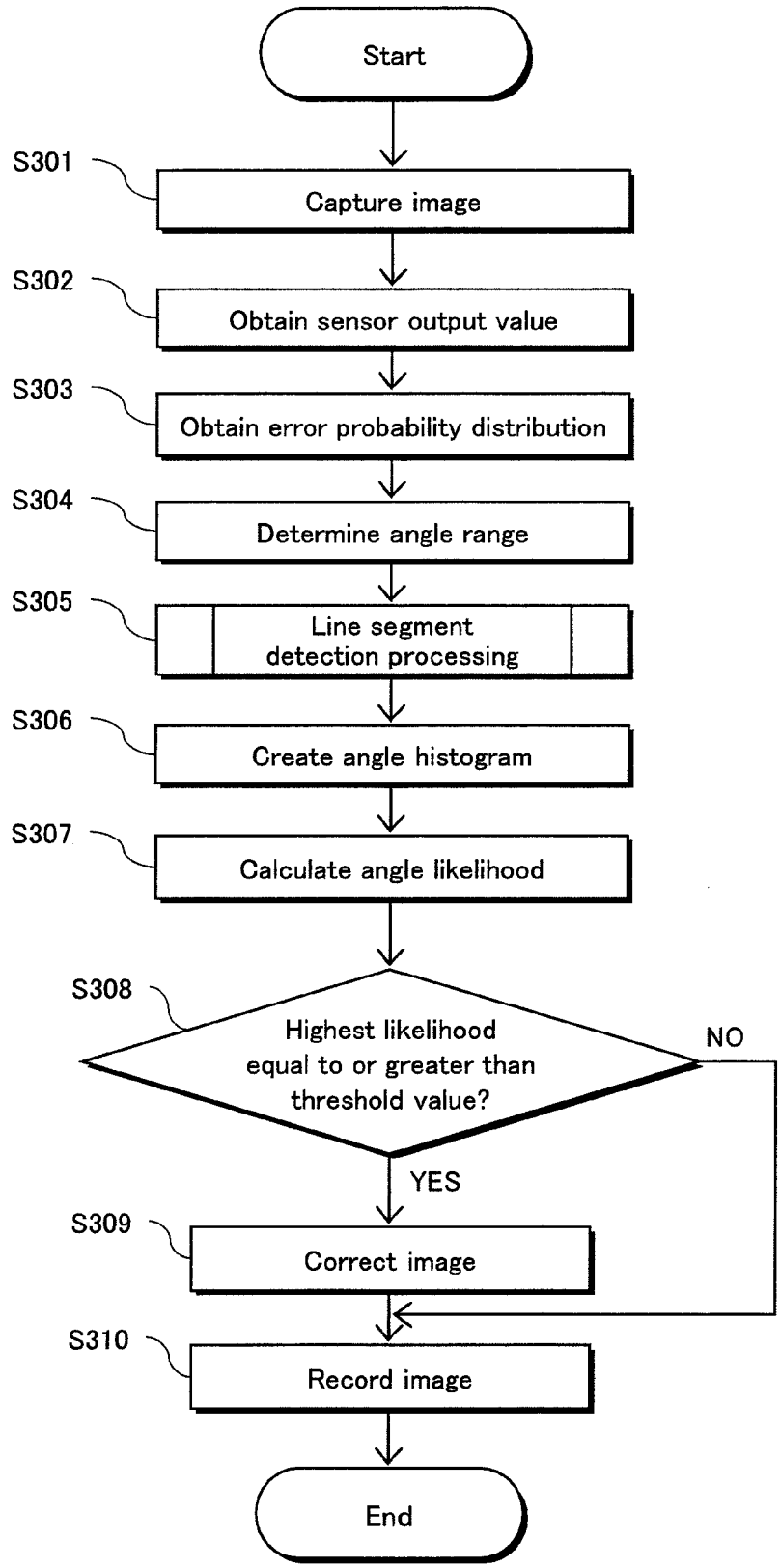

FIG. 18 is a flowchart showing the operation of the wearable camera 100a.

Steps S303, S307, and S308 differ from the wearable camera 100, whereas other steps are processed in the same way.

Figure 19:
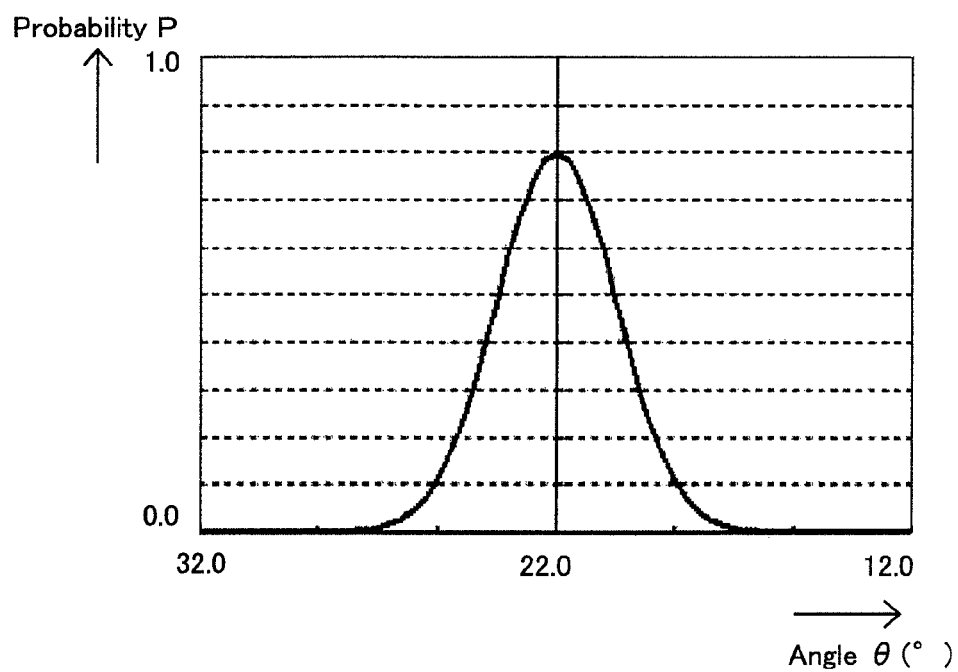
FIG. 19 shows an example of an error probability distribution.

In step S303, the error probability distribution obtaining unit 35 obtains from the storage unit 80 the error probability distribution corresponding to the output of the sensor obtained in step S302. FIG. 19 shows an example of an error probability distribution, specifically the probability distribution when the sensor outputs an angle of 22.0°.

In step S307, the angle likelihood is calculated from the error probability distribution obtained in step S303 and the angle histogram created in step S306. The angle likelihood is the degree indicating how similar an angle is to the correct angle. Letting the angle be θ, the angle histogram h (θ), and the error probability distribution p (θ), then the angle likelihood y(θ) is defined in equation 9.

$$y(\theta) = h(\theta) \times p(\theta) \quad \text{(Equation 9)}$$

In step S308, ymax, the maximum value of y(θ), is compared to a predetermined threshold value, and when ymax is equal to or greater than the threshold value ("Yes" in step S308), then the image is corrected in accordance with the angle θ corresponding to ymax. Concretely, image correction is performed by rotating the image by exactly the angle θ in the opposite direction.

As described above, in the present embodiment, even when the histogram values in step S306 grow large because of multiple angles that are close together, e.g. 23° and 28°, the image's inclination angle can be estimated reflecting the sensor's error distribution from the likelihood function in Equation 9, thereby allowing both the estimation of the inclination angle and the correction to be more precise.

Embodiment 3

In Embodiment 2, the error probability distribution was obtained in order to calculate the angle likelihood y(θ). When an acceleration sensor is used in the sensing unit 12, however, the rotation angle is measured with reference to the acceleration produced by gravity, and therefore when the camera is in motion, both acting acceleration stemming from motion and gravitational acceleration end up being measured together, and the measurement error consequently grows larger than when the camera is at rest.

Therefore, in Embodiment 3, both the error probability distribution when the wearable camera is at rest and when in motion are stored, the wearable camera's current motion status is determined, and the error probability distribution corresponding to that status is obtained, yielding an accurate estimation of the image's inclination angle.

<Structure>

The wearable camera 100b in the present embodiment comprises the wearable camera 100 in Embodiment 1 with the addition of a storage unit 80b, which stores the error probability distributions when at rest and when in motion separately, and with correction processing unit 30 replaced by correction processing unit 30b. The function of other units is the same as the wearable camera 100 in Embodiment 1. Only the areas that differ from the wearable camera 100 are described below.

The storage unit 80b stores the error probability distributions when at rest and when in motion. FIG. 20A shows the error probability distribution table when at rest. FIG. 20B shows the error probability distribution table when in motion. When in motion, error is greater than when at rest, and it is clear that the probability that the difference will not be 0 therefore increases.

FIG. 21 shows the detailed functions of the correction processing unit 30b. The correction processing unit 30b comprises the correction processing unit 30a with the addition of a motion status determining unit 37, which determines the motion status of the wearable camera 100b in accordance with the sensor output value.

In the present embodiment, the error probability distribution obtaining unit 35b obtains from the storage unit 80b the appropriate error probability distribution in accordance with the determined motion status and on the detected angle.

<Operation>

Figure 22:
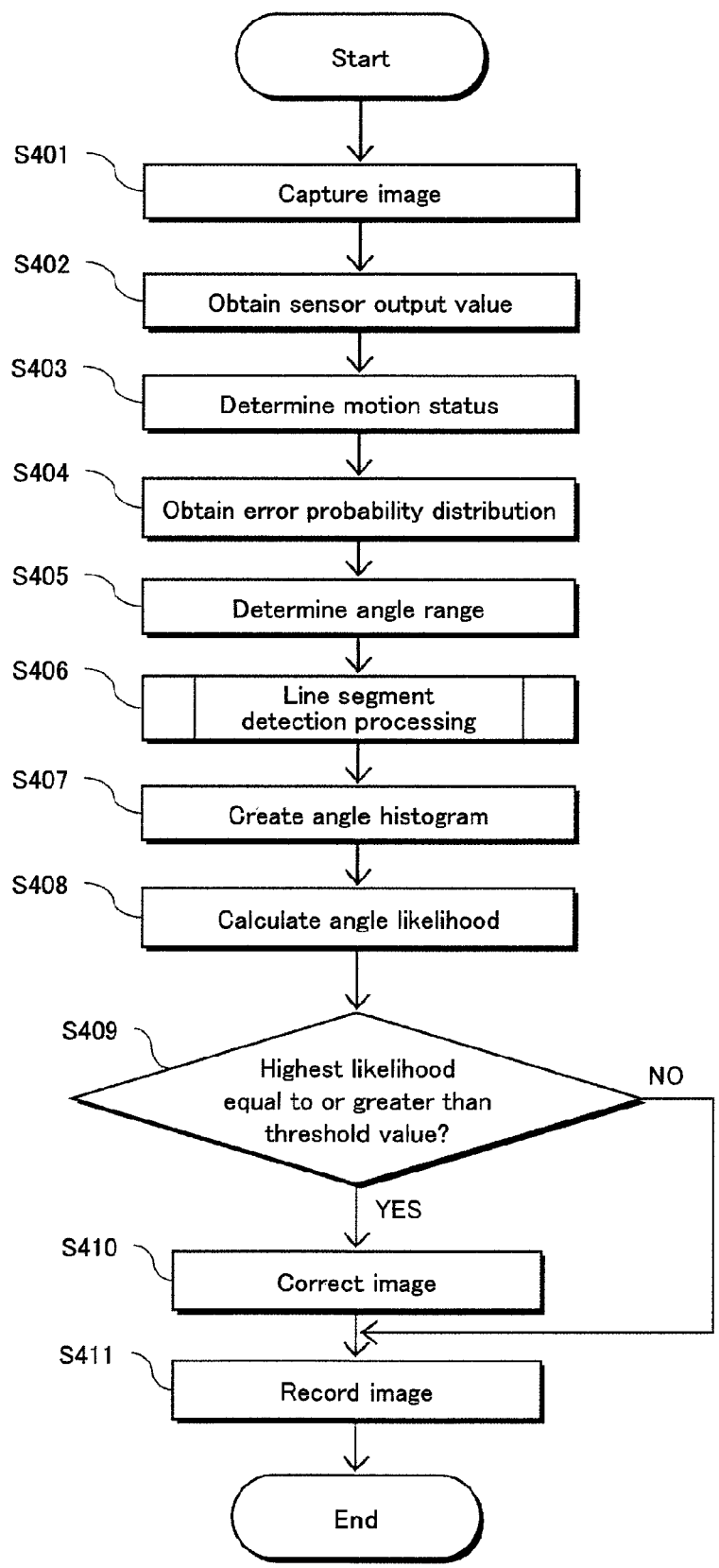
FIG. 22 is a flowchart showing the operation of the wearable camera 100b.

FIG. 22 is a flowchart showing the operation of the wearable camera 100b.

Steps S403 and S404 differ from the wearable camera 100a, whereas other steps are processed in the same way.

In step S403, the wearable camera 100b's motion status is determined, in accordance with the sensor's output value obtained in step S402. The motion status refers to states of motion of the wearable camera 100b, such as "at rest," "in motion," etc. For example, the motion status determining unit 37 calculates the time-series variation of the output values from step S402; if the variation is equal to or less than a predetermined threshold value, the camera is deemed to be at rest, whereas if it is larger, the camera is deemed to be in motion.

Furthermore, in step S404, in accordance with the status as determined in step S403 and on the sensor's output value obtained in step S402, the corresponding error probability distribution is obtained.

As described above, by determining the motion status of the wearable camera 100b and obtaining an error probability distribution corresponding to the motion status, the present embodiment allows for more precise image correction.

Embodiment 4

In the afore-mentioned embodiments, lines in the captured image were detected via calculation of an angle histogram, but instead of detecting lines in the captured image, the luminance gradient, i.e. the direction of change in contrast, of each pixel in the image can be calculated and the frequency used as an angle histogram. This is because the difference in contrast with other areas for a line is great, and the presence of a line is perceived by its difference with other areas; therefore, similar results to detecting lines can be achieved by detecting changes in local contrast.

Figure 23:
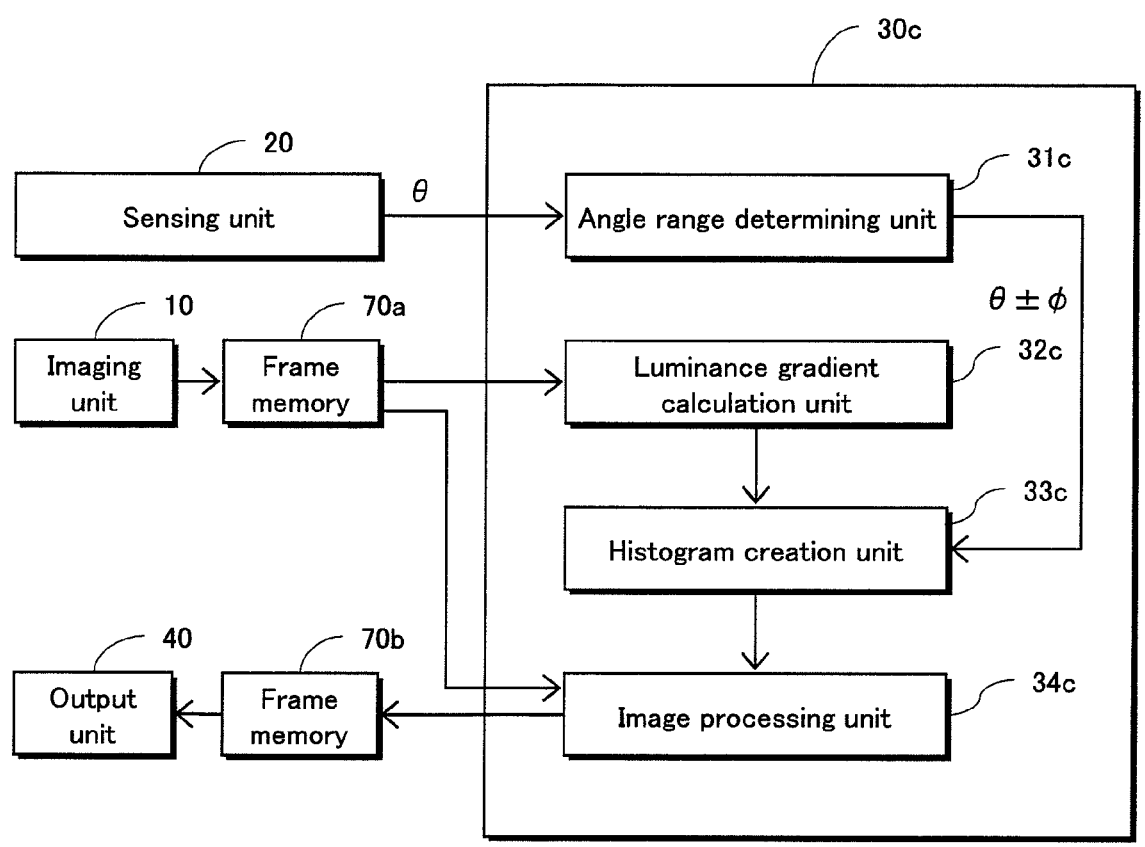
FIG. 23 shows a functional block diagram for the wearable camera 100c.

FIG. 23 shows a functional block diagram for the wearable camera 100c in the present embodiment. In the wearable camera 100c, the correction processing unit 30 in the wearable camera 100 from Embodiment 1 is replaced by correction processing unit 30c. The function of other units is the same as the wearable camera 100 in Embodiment 1. Only the areas that differ from the wearable camera 100 are described below.

In accordance with the rotation angle input from the sensing unit 20, the angle range determining unit 31c determines the angle range $\theta \pm \phi$ used in creating the angle histogram and then transmits the angle range to the histogram creation unit 33c.

The luminance gradient calculation unit 32c obtains the image captured by the imaging unit 10 from the frame memory 70a, calculates the luminance gradient of each pixel in the obtained image, and outputs the gradients to the histogram creation unit 33c. Details about the calculation of luminance gradients are provided below in Luminance Gradient Calculation>.

Within the angle range $\theta \pm \phi$ input from the angle range determining unit 31c, the histogram creation unit 33c counts the frequency of luminance gradients for each pixel as input from the luminance gradient calculation unit 32c and creates an angle histogram indicating the frequency of each luminance gradient. It also selects the most frequent luminance gradient and sends it to the image processing unit 34c.

The image processing unit 34c obtains the image to be corrected from the frame memory 70a, performs image processing in accordance with the luminance gradient input from the histogram creation unit 33c, and records the processed image on the frame memory 70b.

<Luminance Gradient Calculation>

Figure 24:
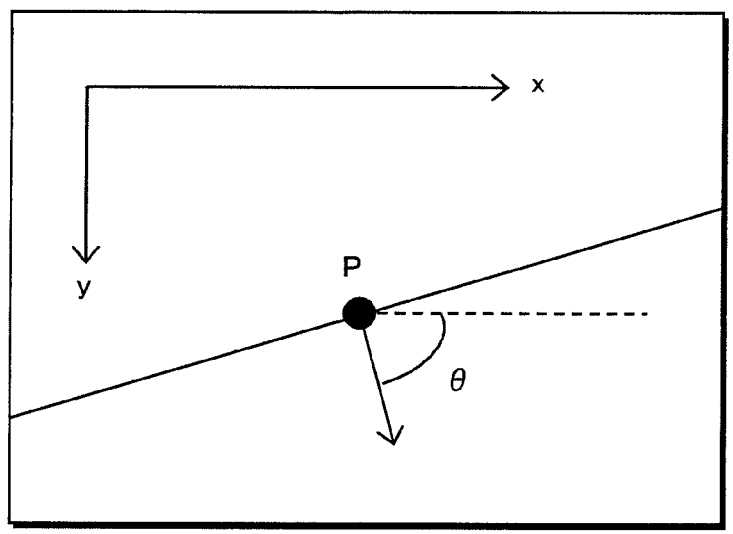
FIG. 24 explains how to seek the direction of change in a pixel's contrast.

With reference to FIGS. 24 and 25, the method for seeking the direction of change in contrast for pixels is described below. In FIG. 24, the pixel value in image I at position P is I(P). The change in contrast in the x-direction and y-direction at position P, or dx, dy, are expressed as $dx = \partial(P)/\partial x$, and $dy = \partial I(P)/\partial y$. In this case, by letting $\theta$ equal the direction of change in contrast, $\theta$ can be sought as in Equation 10.

$$\theta = \tan^{-1}(dy/dx) \quad \text{(Equation 10)}$$

Furthermore, as shown in FIG. 24, when a line traverses position P, the direction of the line is orthogonal to $\theta$.

As a method for seeking dx, dy, a filter such as a Sobel filter is used. A Sobel filter is a filter with coefficients such as in FIG. 25, which are used respectively to measure the change in contrast in the vertical and horizontal direction.

As described above, in the present embodiment an angle histogram indicating the frequency of each luminance gradient within the angle range $\theta \pm \phi$ input from the angle range determining unit 31c is created, and correction performed in accordance with the luminance gradient with the highest frequency therein, thereby improving the accuracy of correction.

Other Modifications

The imaging apparatus relating to the present invention has been explained through several embodiments, but of course the present invention is not limited to the afore-mentioned embodiments.

(1) In the afore-mentioned embodiments, for example, a distortion correction unit to correct the distortion in the image photographed by the imaging unit 10 could be added, with the correction processing unit 30 performing correction in accordance with the image corrected for distortion.

Here, image distortion particularly refers to distortion originating in the imaging unit 10's optical system. If the effects of distortion remain, objects that in the real world are actually straight will appear bent in the image. Even if information regarding the inclination angle is obtained from such an image, real world information may not be reflected accurately. By correcting for this, objects that are straight lines in the real world will also appear as straight lines in the image, which can improve the precision of correction. One possible correction method for distortion that can be used is the method listed in the non-patent literature below.

Non-patent literature 1: Roger Y. Tsai: "An Efficient and Accurate Camera Calibration Technique for 3D Machine Vision", IEEE Conference on Computer Vision and Pattern Recognition, pp. 364-374, 1986.

(2) In the afore-mentioned embodiments, when creating the angle histogram, for example, weighting can be performed according to the length of each line. By doing so, if for example a conspicuous line stretching from one edge of the image to the other exists, increasing the weight of the line allows for stable estimation of a comprehensive inclination angle, even in an environment with many short lines.

Weighting can also be performed according to the angle of each line. For example, objects that are vertical in the real world remain vertical even if orientation in the pitch or yaw directions changes at the time of photographing. Objects that are horizontal in the real world, however, may appear inclined in an image when not faced directly, and it may be difficult to establish the correspondence between the actual angle and the angle in the image. Therefore, out of the lines present in the image, it can be concluded that the angle for lines with angles nearly perpendicular in the real world is more reliable. In this case, weighting can be thought of as applicable uniformly to a predetermined angle range, or weighting can be increased as the lines approach perpendicularity. Furthermore, weighting can also be determined in accordance with the error distribution of the sensor contained in the sensing unit 20. For example, if the acceleration sensor's error follows a normal distribution with an average $\mu$ and standard deviation $\sigma$, then the very value of the probability density function for this normal distribution can be used for weighting. Additionally, weighting can be applied whereby the weight increases as the difference between the rotation angle detected by the sensor and the inclination angles of the lines comprising the image grows smaller.

(3) The afore-mentioned embodiments use a piezoresistive acceleration sensor, but this is not the only type of sensor that can be used. For example, a capacitance or thermal sensing type acceleration sensor could be used, as could a gyro.

(4) In the afore-mentioned embodiments, the output unit 40 records on the recording medium the image that underwent correction processing by the correction processing unit 30. However, it could also append the rotation angle as metadata to the image photographed by the imaging unit 10 and then record the image. Standard formats for metadata such as EXIF (Exchangeable Image File Format) or MPEG (Moving Picture Expert Group) 7, MPEG 21, etc. exist, and metadata can be appended following these standards. Metadata formats are not limited to those listed here, and other industry standards or independent standards could be used. The metadata could also be embedded in the image data as a watermark.

Furthermore, after the information showing the inclination angle of the receiving surface detected by the sensing unit 20 has been appended as metadata to the image photographed by the imaging unit 10, the communication unit 50 could transmit the image with appended metadata to an external server where the image is to be corrected.

(5) In the afore-mentioned embodiments, $\phi$ was equal to $a\sigma$, but the value of $\phi$ could also be set at a predetermined value.

(6) In the afore-mentioned embodiments, when multiple angles in the angle histogram have the highest frequency, the inclination angle suitable for correction could be selected in accordance with the sensor's error distribution. Concretely, the angle with a smaller error, i.e. the angle closest to the sensor's output angle, would be selected as the angle suitable for correction.

(7) In Embodiment 1, when the value of the highest frequency does not surpass a threshold value ("No" for step S106), the image processing unit 34 did not perform processing. However, when the highest frequency in the angle histogram goes below the threshold value, the image processing unit 34 could refrain from using the inclination angle corresponding to the highest frequency for image correction, instead performing correction processing of the captured image using the rotation angle detected by the sensing unit 20.

A particular subject in the image could be extracted and processed for recognition, and in accordance with those results, correction processing in step S107 could be performed when that subject is detected. In this case, something that can point in a certain direction, e.g. a subject that typically stands upright such as a tree, telephone pole, building, etc., would preferably be used for detection. Concretely, the image of a telephone pole, building, etc. could, for example, be prerecorded, and using image recognition technology, when an image extracted from the photographed image can be recognized as one of the recorded images, correction could be performed in accordance with the inclination angle of the extracted image.

Instead of detecting a particular subject within the image, the sensing unit 20 could be equipped with a means for position detection such as a GPS (Global Positioning System) which could measure the position of the photographed image, and for example correction processing in step S107 could be performed when the image was photographed in a particular position such as a city with many buildings, i.e. an area with a high probability of having many horizontal or vertical lines. Concretely, latitude and longitude information could for example be associated with location information indicating an urban or other area, and such information could be maintained. When the location information associated with the longitude and latitude information corresponding to the position detected by the GPS matches the pre-established location information, correction could be performed. Furthermore, instead of maintaining the information associating latitude and longitude information with location information indicating an urban or other area on the wearable camera, the location information corresponding to the position detected by the GPS could be requested from an external server.

(8) In flowchart 9, the inclination angle is estimated directly from the photographed image through image processing. However, the processing to correct the image using the angle obtained from the sensing unit 20 or the like, as well as processing to estimate the inclination angle from the image, could both be performed. A plausible concrete embodiment would be first to correct the image in accordance with the angle obtained from the sensing unit 20, and then to perform supplementary image processing for the part corresponding to sensor error.

In Embodiment 1, as shown in FIG. 10, the angle range established in Step S103 of FIG. 9 was one range, but the angle range could also be set to multiple ranges, such as ($\theta 1 \leq \theta \leq \theta 2, \theta 3 \leq \theta \leq \theta 4, \dots$). In this case, the steps from step S203 onwards in FIG. 10 would be repeated for each of the ranges.

(9) In Embodiment 2, as shown in FIG. 16, for the error probability distribution the acceleration sensor is divided into one degree increments, yet for angles within these increments, such as 1.5 degrees, etc., the error probability for the sensor angle on either side could be linearly interpolated and used. Similarly, a linearly interpolated value for contiguous angular intervals could be used for the delta angle as well.

(10) In Embodiment 2, the error probability distribution stored in the storage unit 80 was saved in a table format, as shown in FIG. 16, yet it could also be expressed as a mathematical model with the acceleration sensor's output angle as a variable. For example, the acceleration sensor's error could be hypothesized to be a Gaussian distribution. The parameter expressing the Gaussian distribution could be saved on the storage unit 80, and this parameter used for calculation in step S303.

Similarly, in Embodiment 3 as well, the parameters for at rest and in motion could each be stored on the storage unit 80b, and in step S404 error distribution could be calculated from the parameter in accordance with the motion status.

(11) In the afore-mentioned embodiments, the range with reference to the rotation angle detected by the acceleration sensor included in the sensing unit 20 was determined in accordance with the acceleration sensor's error distribution, and lines within this range were detected in the captured image. Lines could also, however, be detected in the captured image without any range restriction, and an angle histogram indicating the frequency of each inclination angle for the detected lines could be created. When selecting the most appropriate inclination angle for correction in accordance with the angle histogram, the range with reference to the rotation angle detected by the acceleration sensor included in the sensing unit 20 could be determined in accordance with the error distribution of the acceleration sensor, weighting could be performed on the corresponding range in the created angle histogram, and the most appropriate inclination angle for image correction could be selected from the weighted range.

(12) In Embodiment 3, multiple motion statuses could be defined, and the error probability distribution for each status could be defined. For example, the degrees of movement when the wearable camera's user is walking and running differ, and therefore the resulting error distributions can be expected to differ. By defining the error distributions for each of these statuses separately, the inclination angle could be estimated according to the motion status more accurately.

(13) The afore-mentioned embodiments described a wearable camera as an example of an imaging apparatus. The present invention is not limited, however, to a wearable camera, and could for example also be a digital camera, a digital camcorder, a cellular phone, etc.

(14) The afore-mentioned embodiments described an imaging apparatus, but the present invention can also be the method comprising the steps shown in the afore-mentioned flowcharts, as well as a program comprising a program code that executes the steps shown in the afore-mentioned flowchart on a computer; it can also be the recording medium that stores the program.

The structure of the afore-mentioned embodiments can be typically implemented as an LSI (Large Scale Integration) integrated circuit. These structural elements can be placed separately on individual chips, or a single chip can contain the entire structure or part of the whole structure. According to their degree of integration, integrated circuits are sometimes called IC, system LSI, super LSI, ultra LSI, etc. The method for the integrated circuit is not limited to LSI, but can also be implemented via a dedicated circuit or a generic processor. In addition, an FPGA (Field Programmable Gate Array) or a configurable processor in which the connections and settings of the circuits in the LSI can be reconfigured could also be used.

Furthermore, if integrated circuit technology that replaces current semiconductor technology appears via advances in semiconductor technology or other derived technology, then of course, the function block can be integrated using that technology. For example, the application of biotechnology, etc. is plausible.

The afore-mentioned embodiments and alternative embodiments can be combined with each other.

Needless to say, the imaging apparatus in the present invention can be modified or adjusted in a variety of ways within the spirit of the present invention, without departing from the scope of the invention.

The imaging apparatus of the present invention is useful as an apparatus to correct changes in the angle of view produced by a camera's movement, and can be applied to imaging apparatuses starting with digital still cameras, and in particular to imaging apparatuses that can be worn on the body.

The invention claimed is:

1. An imaging apparatus for correcting inclination of one or more subjects in a captured image by applying a rotational transform to the captured image, the imaging apparatus comprising:
an imaging unit operable to capture an image;
a sensor operable to detect a physical inclination angle of the imaging unit;
an image processing unit operable to determine an angle range that includes the physical inclination angle detected by the sensor when the imaging unit has captured the image and a width determined from measurement errors of the sensor, and then to detect a plurality of angular components in one or more subjects appearing in the image captured by the imaging unit, the plurality of angular components individually falling within the angle range; and
a correction processing unit operable to measure a frequency distribution of the plurality of angular components to select one of angular components as a rotation angle for the rotational transform based on the frequency distribution, and then to apply the rotational transform to the image.

2. The imaging apparatus of claim 1, wherein
the plurality of angular components are inclination angles of lines appearing in the image,
the correction processing unit creates a histogram indicating the frequency distribution, and
the rotation angle selected by the correction processing unit has a specific frequency in the histogram created by the correction processing unit, the specific frequency satisfying a criterion for determining an angular component probably equal to a true inclination angle by which the imaging unit was tilted when having captured the image.

3. The imaging apparatus in claim 2, wherein
the criterion indicates that the specific frequency is a highest frequency in the histogram.

4. The imaging apparatus in claim 2, wherein
the imaging apparatus further includes a position detection unit operable to detect a position of the imaging apparatus, wherein
when none of the plurality of angular components has the specific frequency, and the position detected by the position detection unit is a predetermined position, the correction processing unit selects one of the plurality of angular components that has the highest frequency in the histogram, as the rotation angle for rotational transform.

5. The imaging apparatus in claim 2 further comprising:
a storage unit storing data for error distributions, each showing uncertainty of a different inclination angle to be detected by the sensor; and
an error distribution obtaining unit operable to refer to the data from the storage unit to obtain one of the error distributions suitable for an inclination angle actually detected by the sensor, wherein
the criterion indicates that a greatest inclination likelihood is calculated from the specific frequent and the one of the error distributions obtained by the error distribution obtaining unit.

6. The imaging apparatus in claim 5, wherein
the error distributions contained in the data stored in the storage unit include both first and second distributions for the imaging apparatus being at rest and in motion respectively, and
the error distribution obtaining unit (i) determines a motion status of the imaging apparatus from the physical inclination angle detected by the sensor, and (ii) obtains the first and second distributions from the storage unit if a motion status shows that the imaging apparatus is at rest and in motion, respectively.

7. The imaging apparatus in claim 2 further comprising:
a storage unit storing data on an arithmetic expression for a relationship between error distributions of the sensor and inclination angles to be detected by the sensor; and
an error distribution calculation unit operable to refer to the data from the storage unit to use the arithmetic expression to calculate one of the error distributions suitable for an inclination angle detected by the sensor, wherein
the criterion indicates that a greatest inclination likelihood is calculated from the specific frequency and the one of the error distributions calculated by the error distribution calculation unit.

8. The imaging apparatus in claim 7, wherein
the data stored in the storage unit contains both first and second expressions for the relationships of the imaging apparatus being at rest and in motion, respectively, and
the error distribution calculation unit (i) determines a motion status of the imaging apparatus from the physical inclination angle detected by the sensor, and (ii) uses the first and second expressions to calculate one of the error distributions if the motion status shows that the imaging apparatus is at rest and in motion, respectively.

9. The imaging apparatus in claim 2, wherein
the correction processing unit, when creating the histogram, assigns weights to frequencies of the plurality of angular components, the weights increasing with lengths of the lines corresponding to the plurality of angular components.

10. The imaging apparatus in claim 2, wherein
the correction processing unit, when creating the histogram, assigns weights to frequencies of the plurality of angular components, the weights increasing with a decrease in inclination from the vertical direction of the lines corresponding to the plurality of angular components.

11. The imaging apparatus in claim 2, wherein
the correction processing unit, when creating the histogram, assigns weights to frequencies of the plurality of angular components, the weights increasing with a decrease in differences between the physical inclination angle detected by the sensor and the inclination angles of the lines corresponding to the plurality of angular components.

12. The imaging apparatus in claim 1, wherein when the frequency distribution shows that none of the plurality of angular components is to be selected, the correction processing unit selects the physical inclination angle detected by the sensor as the rotation angle for the rotational transform.

13. The imaging apparatus in claim 1, wherein
the image processing unit further includes a detection unit operable to detect a particular subject in image, and
when the frequency distribution shows that none of the plurality of angular components is to be selected, the correction processing unit selects an inclination angle of the particular subject as the rotation angle for the rotational transform.

14. The imaging apparatus in claim 1, further comprising
a distortion correction unit operable to correct a distortion of the image before the process by the image processing unit to detect the plurality of angular components in the image.

15. A method for correcting inclination of one or more subjects in a captured image by applying a rotational transform to the captured image, comprising:
   detecting a physical inclination angle of an imaging unit using a sensor when the image unit captures an image;
   determining an angle range that includes the physical inclination angle and a width determined from measurement errors of the sensor;
   detecting a plurality of angular components in one or more subjects appearing in the image, the plurality of angular components individually falling within the angle range;
   measuring a frequency distribution of the plurality of angular components;
   selecting one of the plurality of angular components as a rotation angle for rotational transform based on the frequency distribution; and
   applying the rotational transform to the image.

16. A system integrated circuit, housed in an imaging apparatus, operable to correct inclination of one or more subjects in a captured image by applying a rotational transform to the captured image, the system integrated circuit comprising:
   an imaging unit operable to capture an image;
   a sensor operable to detect a physical inclination angle of the imaging unit;
   an image processing unit operable to determine an angle range that includes the physical inclination angle detected by the sensor when the imaging unit has captured the image and a width determined from measurement errors of the sensor, and then to detect a plurality of angular components in one or more subjects appearing in the image captured by the imaging unit, the plurality of angular components individual falling within the angle range; and
   a correction processing unit operable to measure a frequency distribution of the plurality of angular components, to select one of the plurality of angular components as a rotation angle for the rotational transform based on the frequency distribution, and then apply the rotational transform to the image.

17. A non-transitory computer-readable recording medium storing a program for correction processing of inclination of one or more subjects in a captured image by applying a rotational transform to the captured image, the computer program causing a computer to perform the steps of:
   detecting a physical inclination angle of an imaging unit by a sensor when the imaging unit captures an image;
   determining an angle range that includes the physical inclination angle and a width determined from measurement errors of the sensor;
   detecting a plurality of angular components in one or more subjects appearing in the image, the plurality of angular components individually falling within the angle range;
   measuring a frequency distribution of the plurality of angular components;
   selecting one of the plurality of angular components as a rotation angle for the rotational transform based on the frequency distribution; and
   applying the rotational transform to the image.

18. An imaging apparatus for correcting inclination of one or more subjects in a captured image by applying a rotational transform to the captured image, the imaging apparatus comprising:
   an imaging unit operable to capture an image;
   a sensor operable to detect a physical inclination angle of the imaging unit;
   an image processing unit operable to detect a plurality of angular components in one or more subjects appearing in the image captured by the imaging unit; and
   a correction processing unit operable to determine an angle range that includes the physical inclination angle detected by the sensor when the imaging unit has captured the image and a width determined from measurement errors of the sensor, to measure a frequency distribution of a portion of the plurality of angular components, the portion including angular components individually falling within the angle range, to select one of the plurality of angular components as a rotation angle for the rotational transform based on the frequency distribution, and then to apply the rotational transform to the image.

19. The imaging apparatus of claim 18, wherein
the plurality of angular components are angles of luminance gradients appearing in the captured image,
the correction processing unit creates a histogram indicating the frequency distribution, and
the rotation angle selected by the correction processing unit has a specific frequency in the histogram created by the correction processing unit, the specific frequency satisfying a criterion for determining an angular component probably equal to a true inclination angle by which the imaging unit was tilted when having captured the image.

* * * * *